(12) United States Patent
Suzuki et al.

(10) Patent No.: US 11,487,104 B2
(45) Date of Patent: Nov. 1, 2022

(54) OPTICAL MODULE

(71) Applicant: HAMAMATSU PHOTONICS K.K., Hamamatsu (JP)

(72) Inventors: Tomofumi Suzuki, Hamamatsu (JP); Kyosuke Kotani, Hamamatsu (JP); Tatsuya Sugimoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 548 days.

(21) Appl. No.: 16/492,712

(22) PCT Filed: Mar. 14, 2018

(86) PCT No.: PCT/JP2018/009975
§ 371 (c)(1),
(2) Date: Sep. 10, 2019

(87) PCT Pub. No.: WO2018/168929
PCT Pub. Date: Sep. 20, 2018

(65) Prior Publication Data
US 2021/0132366 A1 May 6, 2021

(30) Foreign Application Priority Data

Mar. 14, 2017 (JP) .............................. JP2017-048561
Jul. 6, 2017 (JP) .............................. JP2017-133086

(51) Int. Cl.
*G02B 26/08* (2006.01)
*G01J 3/02* (2006.01)
(Continued)

(52) U.S. Cl.
CPC .......... *G02B 26/0841* (2013.01); *G01J 3/021* (2013.01); *G01J 3/45* (2013.01); *G01J 3/4535* (2013.01)

(58) Field of Classification Search
CPC .. B81B 3/00; G02B 26/0833; G02B 26/0841; G01J 3/45; G01J 3/4535; G01J 3/021
See application file for complete search history.

(56) References Cited

U.S. PATENT DOCUMENTS

| 4,973,160 A | 11/1990 | Takiguchi et al. |
| 11,067,380 B2 * | 7/2021 | Suzuki .................. B81B 3/007 |

(Continued)

FOREIGN PATENT DOCUMENTS

| CN | 1908702 A | 2/2007 |
| CN | 102466828 A | 5/2012 |

(Continued)

OTHER PUBLICATIONS

Internationl Preliminary Report on Patentability dated Sep. 26, 2019 for PCT/JP2018/010019.

(Continued)

*Primary Examiner* — Violeta A Prieto
(74) *Attorney, Agent, or Firm* — Faegre Drinker Biddle & Reath LLP

(57) ABSTRACT

An optical module includes a base which has a main surface and in which a mounting region and a driving region for moving the mounting region along a first direction parallel to the main surface are provided, a movable mirror which has a mirror surface having a positional relationship of intersecting the main surface and is mounted in the mounting region, a first fixed mirror which has a mirror surface having a positional relationship of intersecting the main surface and of which a position with respect to the base is fixed, and a beam splitter unit which constitutes a first interference optical system for measurement light together with the movable mirror and the first fixed mirror. The (Continued)

mirror surface of the movable mirror and the mirror surface of the first fixed mirror are directed to one side in the first direction.

14 Claims, 9 Drawing Sheets

(51) Int. Cl.
 *G01J 3/45* (2006.01)
 *G01J 3/453* (2006.01)

(56) References Cited

U.S. PATENT DOCUMENTS

| | | | |
|---|---|---|---|
| 2001/0048784 | A1 | 12/2001 | Behin et al. |
| 2001/0053261 | A1 | 12/2001 | Goldstein et al. |
| 2002/0186477 | A1 | 12/2002 | Wang et al. |
| 2003/0049879 | A1 | 3/2003 | Lin |
| 2003/0227681 | A1* | 12/2003 | Currie ............... G01N 21/031 359/857 |
| 2004/0028321 | A1 | 2/2004 | Sunaga et al. |
| 2008/0100899 | A1 | 5/2008 | Shimokawa et al. |
| 2010/0103492 | A1 | 4/2010 | Maruyama et al. |
| 2010/0188728 | A1* | 7/2010 | Warashina ......... G01B 9/02051 359/290 |
| 2010/0208347 | A1 | 8/2010 | Kouma et al. |
| 2010/0265512 | A1* | 10/2010 | Medhat ................ G02B 17/023 430/319 |
| 2012/0099176 | A1 | 4/2012 | Zhou |
| 2012/0327493 | A1 | 12/2012 | Koide et al. |
| 2014/0019236 | A1 | 1/2014 | Argue et al. |
| 2014/0104687 | A1* | 4/2014 | Warashina ......... G01B 9/02056 216/2 |
| 2014/0139924 | A1* | 5/2014 | Warashina ........... G02B 26/001 359/578 |
| 2014/0168736 | A1 | 6/2014 | Mizoguchi |
| 2014/0192365 | A1 | 7/2014 | Mortada et al. |
| 2016/0299335 | A1 | 10/2016 | Hofmann et al. |
| 2020/0124469 | A1* | 4/2020 | Sugimoto ................ G01B 9/02 |
| 2021/0130159 | A1* | 5/2021 | Sugimoto ............. B81B 3/0059 |
| 2021/0148690 | A1* | 5/2021 | Suzuki ............... G01B 9/02051 |
| 2021/0155471 | A1* | 5/2021 | Sugimoto ................ B81B 3/00 |
| 2021/0191106 | A1* | 6/2021 | Sugimoto ............. H02N 1/008 |
| 2021/0278274 | A1* | 9/2021 | Suzuki ................ G02B 27/144 |

FOREIGN PATENT DOCUMENTS

| | | |
|---|---|---|
| CN | 103210445 A | 7/2013 |
| CN | 103547528 A | 1/2014 |
| CN | 103582830 A | 2/2014 |
| CN | 104216107 A | 12/2014 |
| CN | 104272070 A | 1/2015 |
| CN | 105164568 A | 12/2015 |
| CN | 105552125 A | 5/2016 |
| CN | 105849618 A | 8/2016 |
| CN | 105992964 A | 10/2016 |
| CN | 106444017 A | 2/2017 |
| CN | 106468828 A | 3/2017 |
| CN | 101786592 A | 7/2019 |
| JP | 2003-159698 A | 6/2003 |
| JP | 2004-82288 A | 3/2004 |
| JP | 2004-102315 A | 4/2004 |
| JP | 2005-43870 A | 2/2005 |
| JP | 2005-308863 A | 11/2005 |
| JP | 2006-091666 A | 4/2006 |
| JP | 2006-102934 A | 4/2006 |
| JP | 2010-170029 A | 8/2010 |
| JP | 2010-184334 A | 8/2010 |
| JP | 2010-286609 A | 12/2010 |
| JP | 2011-2698 A | 1/2011 |
| JP | 2012-524295 A | 10/2012 |
| JP | 2012-215691 A | 11/2012 |
| JP | 2012-240129 A | 12/2012 |
| JP | 2012-242450 A | 12/2012 |
| JP | 2014-055871 A | 3/2014 |
| JP | 2014-192365 A | 10/2014 |
| WO | WO 2008/084520 A1 | 7/2008 |
| WO | WO-2010/121185 A1 | 10/2010 |
| WO | WO 2012/002101 A1 | 1/2012 |

OTHER PUBLICATIONS

Internationl Preliminary Report on Patentability dated Sep. 26, 2019 for PCT/JP2018/009992.

Internationl Preliminary Report on Patentability dated Sep. 26, 2019 for PCT/JP2018/009975.

Internationl Preliminary Report on Patentability dated Sep. 26, 2019 for PCT/JP2018/009973.

Zongquan Deng, "Design of Space Deplovable and Foldable Mechanisms", Harbin Institute of Technology Press, Jun. 2013 (including abstract).

Shujing Su et al., "The Design of Two-kind Wafer Micro-mirror Actuated by Heat," Journal of Test and Measurement Technology, North China Institute of Technology, 030051, vol. 16, Jun. 2002, Dec. 31, 2002.

* cited by examiner

Fig.4
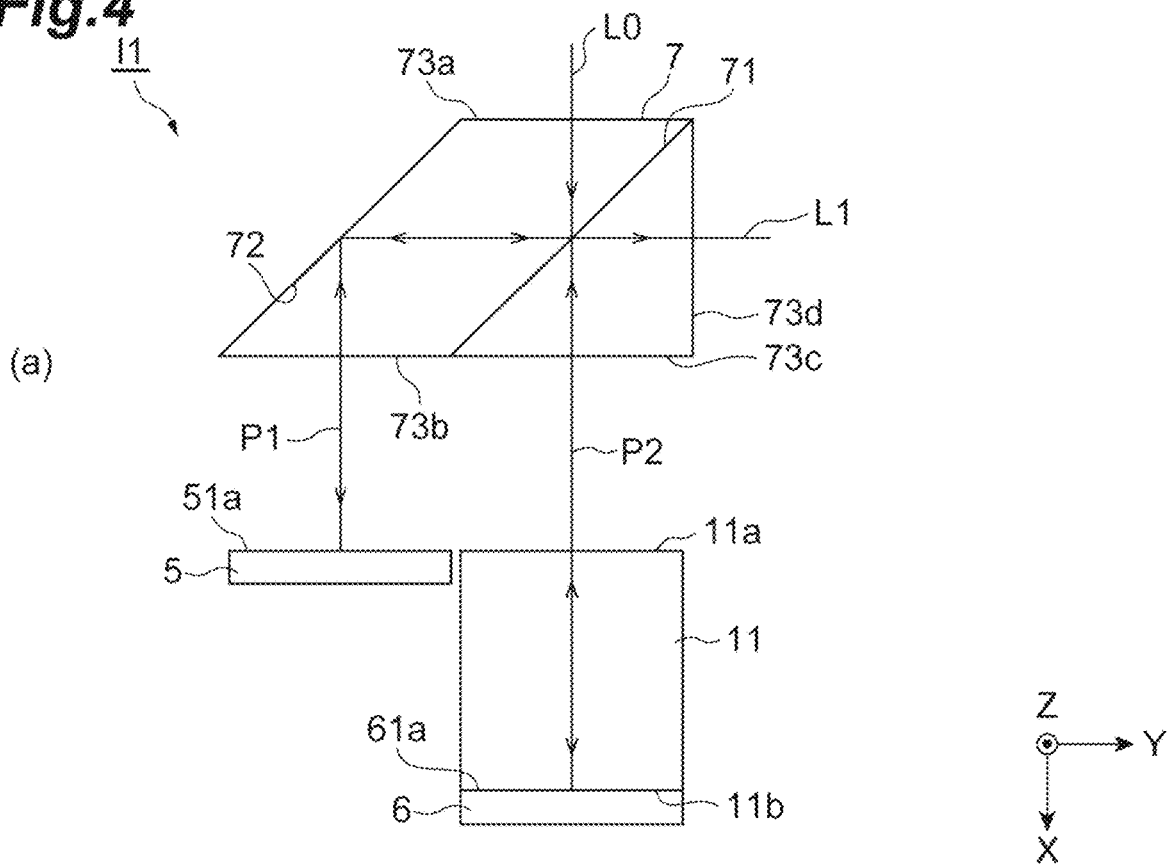
(a)
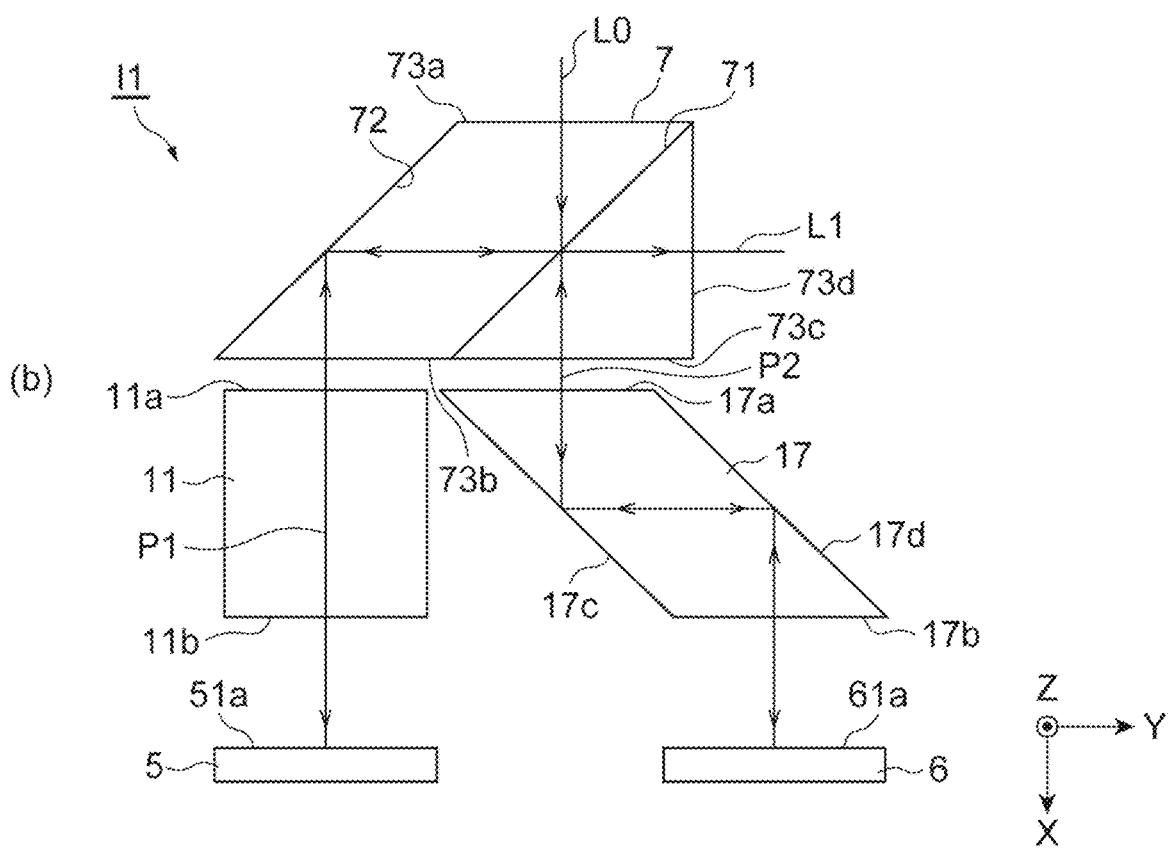
(b)

Fig.8
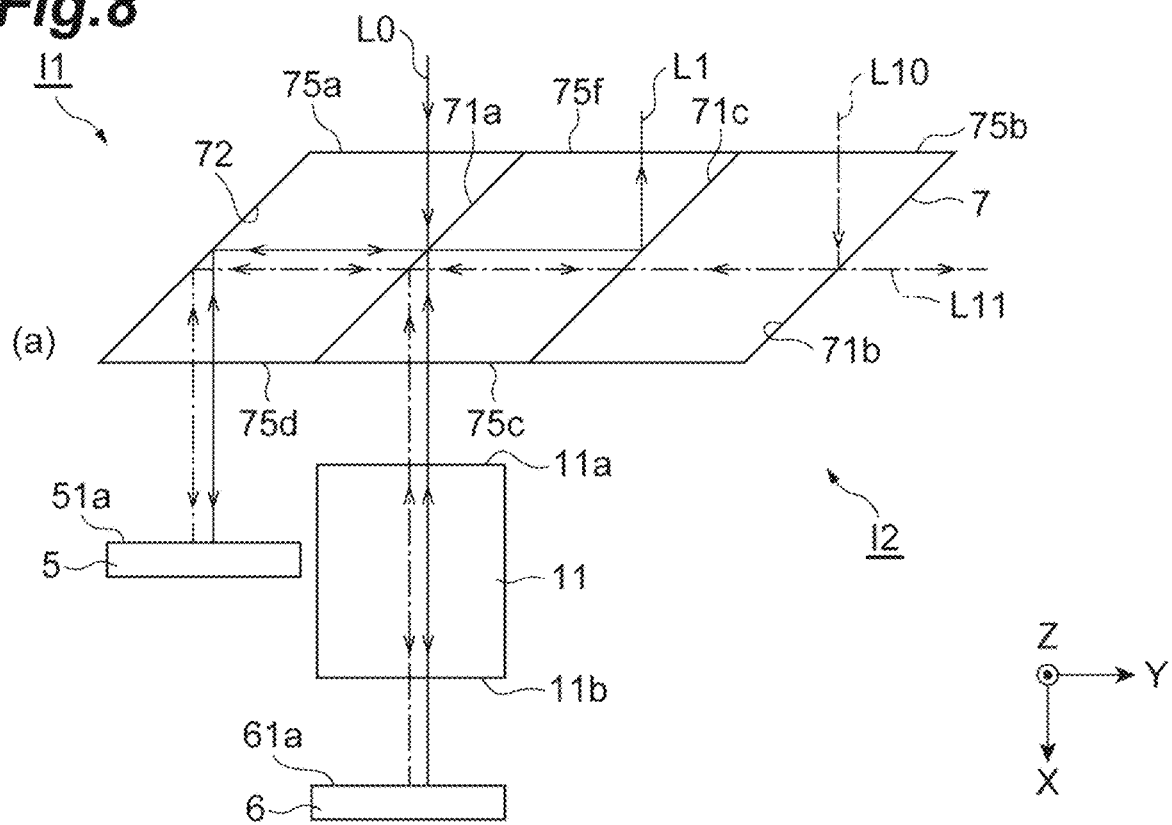
(a)
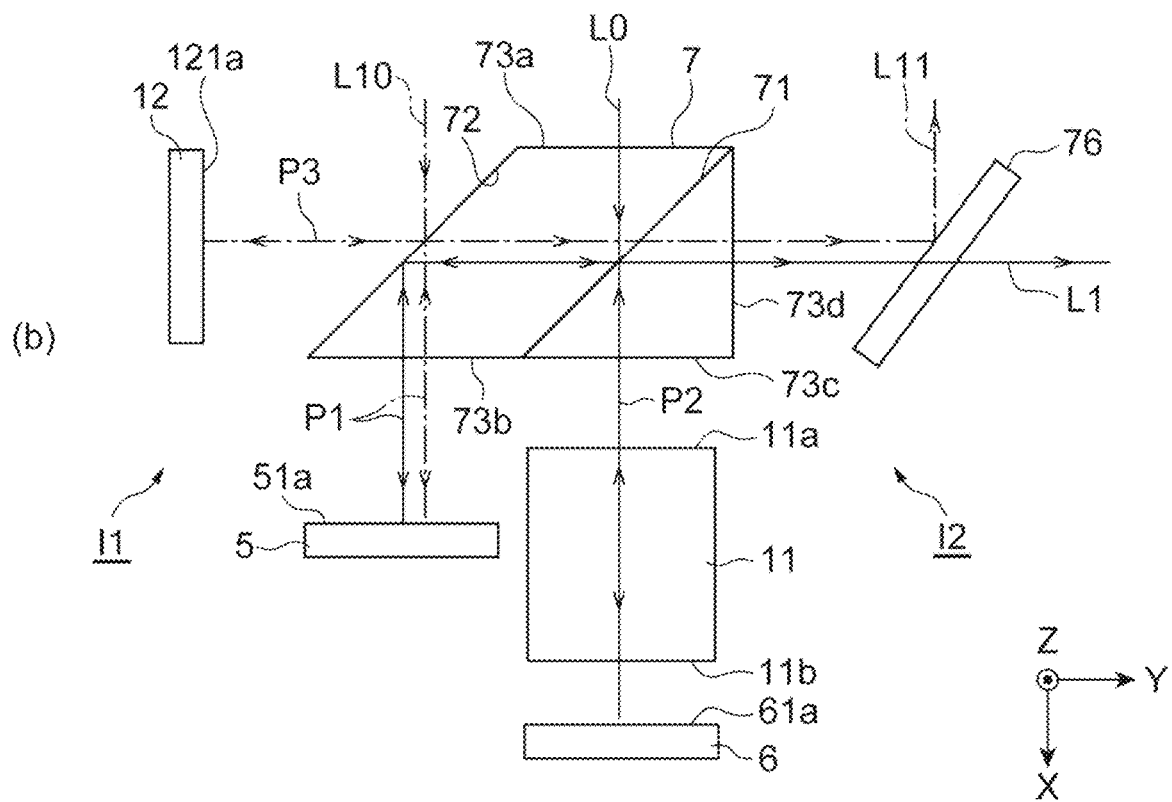
(b)

Fig. 9
(a)
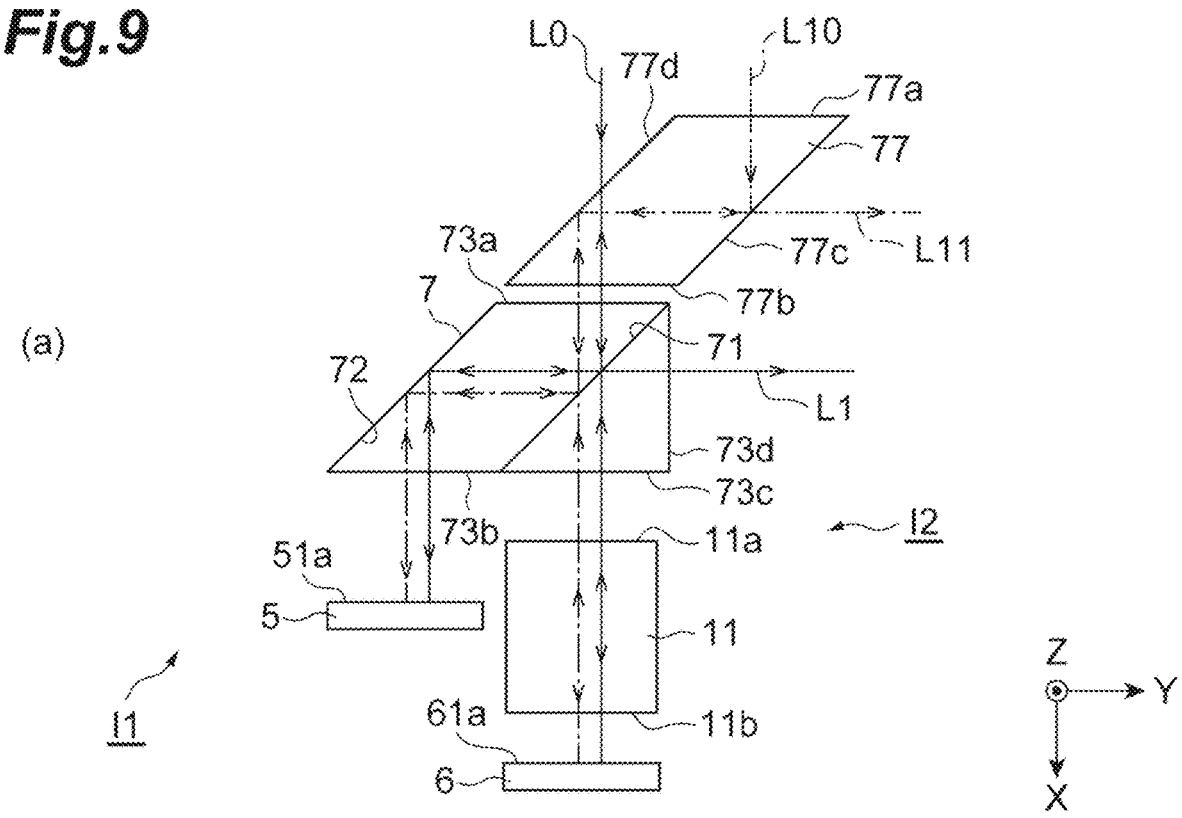
(b)
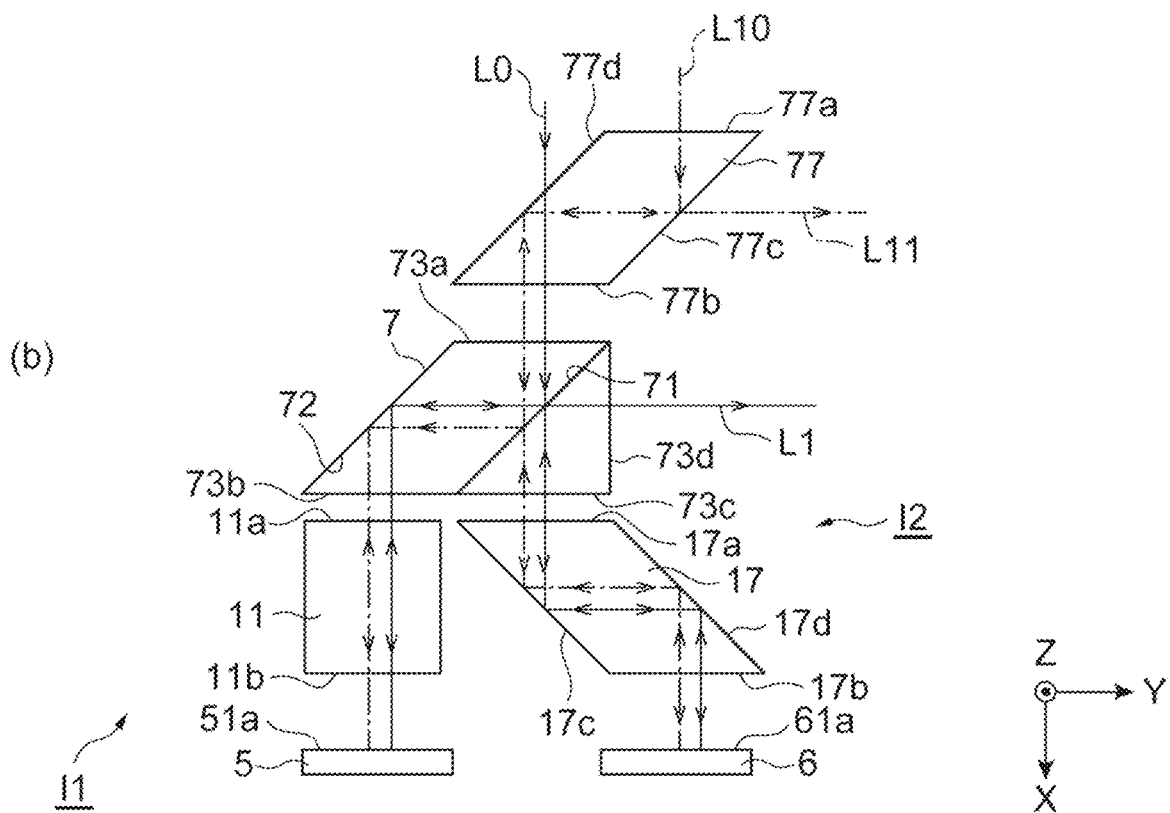

OPTICAL MODULE

TECHNICAL FIELD

The present disclosure relates to an optical module.

BACKGROUND ART

Optical modules in which an interference optical system is formed on a silicon-on-insulator (SOI) substrate by a micro electro mechanical systems (MEMS) technology are known (for example, refer to Patent Literature 1). Such optical modules have attracted attention because they can provide users with a Fourier transform infrared spectroscopic analyzer (FTIR) in which highly accurate optical disposition is realized.

CITATION LIST

Patent Literature

Patent Literature 1: Japanese Unexamined Patent Publication No. 2012-524295

SUMMARY OF INVENTION

Technical Problem

However, the foregoing optical modules have the following problem in respect that the size of a mirror surface of a movable mirror depends on a degree of completion of deep cutting with respect to an SOT substrate, for example. That is, since the degree of completion of deep cutting with respect to an SOI substrate is approximately 500 μm at the maximum, there is a limitation in increasing the size of a mirror surface of a movable mirror for the sake of improvement of sensitivity of an FTIR.

Here, a technology of mounting a separately formed movable mirror in a base constituted of an SOI substrate, for example, may be taken into consideration. In such a technology, it is ascertained that there is a need to measure whether or not an angular deviation of a mirror surface of a movable mirror is kept within a predetermined range.

An object of the present disclosure is to provide an optical module in which a mirror surface of a movable mirror can be increased in size and whether or not an angular deviation of the mirror surface of the movable mirror is kept within a predetermined range can be easily measured.

Solution to Problem

According to an aspect of the present disclosure, there is provided an optical module including a base which has a main surface and in which a mounting region and a driving region for moving the mounting region along a first direction parallel to the main surface are provided, a movable mirror which has a mirror surface having a positional relationship of intersecting the main surface and is mounted in the mounting region, a first fixed mirror which has a mirror surface having a positional relationship of intersecting the main surface and of which a position with respect to the base is fixed, and a beam splitter unit which constitutes a first interference optical system for measurement light together with the movable mirror and the first fixed mirror. The mirror surface of the movable mirror and the mirror surface of the first fixed mirror are directed to one side in the first direction.

In this optical module, the movable mirror which has the mirror surface having a positional relationship of intersecting the main surface of the base is mounted in the mounting region of the base. Accordingly, the mirror surface of the movable mirror can be increased in size. Furthermore, in this optical module, the mirror surface of the movable mirror mounted in the mounting region, and the mirror surface of the first fixed mirror of which the position with respect to the base is fixed are directed to one side in the first direction parallel to the main surface of the base. Accordingly, for example, compared to a case where the mirror surface of the movable mirror and the mirror surface of the first fixed mirror have a positional relationship of being orthogonal to each other, it is possible to easily measure whether or not an angular deviation of the mirror surface of the movable mirror is kept within a predetermined range with reference to the mirror surface of the first fixed mirror. From the above, according to this optical module, the mirror surface of the movable mirror can be increased in size and whether or not an angular deviation of the mirror surface of the movable mirror is kept within a predetermined range can be easily measured.

According to the aspect of the present disclosure, in the optical module, an opening may be formed in the mounting region. The movable mirror may have a mirror portion which has the mirror surface, an elastic portion which is coupled to the mirror portion, and a support portion to which an elastic force is applied in accordance with elastic deformation of the elastic portion. The support portion may be inserted into the opening in a state where an elastic force of the elastic portion is applied. The movable mirror may be fixed to the mounting region due to a reaction force of the elastic force applied from an inner surface of the opening to the support portion. Accordingly, the movable mirror can be easily mounted in the mounting region with high accuracy. On the other hand, for example, it is concern that an angular deviation may occur on the mirror surface of the movable mirror due to particles sandwiched between the support portion and the inner surface of the opening. Therefore, as described above, a configuration capable of easily measuring whether or not an angular deviation of the mirror surface of the movable mirror is kept within a predetermined range is particularly effective.

According to the aspect of the present disclosure, in the optical module, the first fixed mirror may be positioned on one side with respect to the movable mirror in a second direction parallel to the main surface and perpendicular to the first direction. At least a portion of the driving region may be positioned on the one side or the other side of the first fixed mirror in the first direction when viewed in a third direction perpendicular to the main surface. Accordingly, it is possible to achieve space saving within a plane parallel to the main surface of the base and to curb increase in size of the optical module in its entirety.

According to the aspect of the present disclosure, in the optical module, the beam splitter unit may include a half mirror surface which reflects a portion of the measurement light and allows a remaining portion of the measurement light to be transmitted therethrough, and a total reflection mirror surface which reflects the portion of the measurement light reflected by the half mirror surface. The half mirror surface and the total reflection mirror surface may be parallel to each other. Accordingly, even if a deviation occurs in an attachment angle of the beam splitter unit around an axis perpendicular to the main surface of the base, as long as an incident angle of measurement light with respect to the beam splitter unit is uniform, an emission angle of measurement light from the beam splitter unit becomes uniform. Furthermore, in this optical module, since the mirror surface of the movable mirror can be increased in size, even if a deviation occurs in an emission position of measurement light from the beam splitter unit, the deviation can be substantially disregarded. Thus, it is possible to alleviate the alignment accuracy of the beam splitter unit.

According to the aspect of the present disclosure, in the optical module, the first fixed mirror may be mounted on the base. Accordingly, it is possible to facilitate the positional alignment of the movable mirror and the first fixed mirror.

According to the aspect of the present disclosure, in the optical module, the beam splitter unit may be mounted on the base. Accordingly, it is possible to facilitate the positional alignment of the movable mirror and the beam splitter unit.

According to the aspect of the present disclosure, the optical module may further include a light transmitting member which is disposed on at least one optical path of a first optical path between the beam splitter unit and the movable mirror and a second optical path between the beam splitter unit and the first fixed mirror and corrects an optical path difference between the first optical path and the second optical path. Accordingly, it is possible to easily obtain interference light of measurement light with high accuracy.

According to the aspect of the present disclosure, in the optical module, the light transmitting member may be mounted on the base. Accordingly, it is possible to facilitate the positional alignment of the movable mirror and the light transmitting member.

According to the aspect of the present disclosure, the optical module may further include a measurement light incident unit which is disposed such that the measurement light is incident on the first interference optical system from outside, and a measurement light emission unit which is disposed such that the measurement light is emitted from the first interference optical system to the outside. Accordingly, it is possible to obtain an FTIR including a measurement light incident unit and a measurement light emission unit.

According to the aspect of the present disclosure, the optical module may further include a second fixed mirror which has a mirror surface having a positional relationship of intersecting the main surface and of which a position with respect to the base is fixed. The beam splitter unit may constitute a second interference optical system for laser light together with the movable mirror and the second fixed mirror. The mirror surface of the second fixed mirror may be directed to the one side in the first direction. Accordingly, the position of the mirror surface of the movable mirror can be measured by detecting interference light of laser light. Furthermore, similar to the mirror surface of the movable mirror, the mirror surface of the second fixed mirror is also directed to one side in the first direction parallel to the main surface of the base. Accordingly, it is possible to easily measure whether or not an angular deviation of the mirror surface of the movable mirror is kept within a predetermined range with reference to the mirror surface of the second fixed mirror.

According to the aspect of the present disclosure, in the optical module, the first fixed mirror and the second fixed mirror may be respectively positioned on both sides with respect to the movable mirror in a second direction parallel to the main surface and perpendicular to the first direction. At least a portion of the driving region may be positioned on the one side or the other side of the first fixed mirror in the first direction and on the one side or the other side of the second fixed mirror in the first direction when viewed in a third direction perpendicular to the main surface. Accordingly, it is possible to achieve space saving within a plane parallel to the main surface of the base and to curb increase in size of the optical module in its entirety.

According to the aspect of the present disclosure, the optical module may further include a filter which is disposed on an optical path where the laser light does not travel and the measurement light travels and cuts light within a wavelength range including a center wavelength of the laser light. Accordingly, it is possible to prevent measurement light from becoming noise in detection of interference light of laser light.

According to the aspect of the present disclosure, the optical module may further include a light source which generates the laser light to be incident on the second interference optical system, and a light detector which detects the laser light emitted from the second interference optical system. Accordingly, since the position of the movable mirror can be detected in real time by detecting laser light, it is possible to obtain an FTIR having higher accuracy.

According to the aspect of the present disclosure, in the optical module, the base may have a device layer which has the main surface and in which the mounting region and the driving region are provided, a support layer which supports the device layer, and an intermediate layer which is provided between the support layer and the device layer. The support layer may be a first silicon layer of an SOI substrate. The device layer may be a second silicon layer of the SOI substrate. The intermediate layer may be an insulating layer of the SOI substrate. Accordingly, it is possible to favorably realize a configuration for reliable movement of the movable mirror mounted in the device layer using the SOI substrate.

Advantageous Effects of Invention

According to the present disclosure, it is possible to provide an optical module in which a mirror surface of a movable mirror can be increased in size and whether or not an angular deviation of the mirror surface of the movable mirror is kept within a predetermined range can be easily measured.

BRIEF DESCRIPTION OF DRAWINGS

FIG. 4 is a schematic view illustrating a modification example of the first embodiment.

FIG. 8 is a schematic view illustrating another modification example of the second embodiment.

FIG. 9 is a schematic view illustrating another modification example of the second embodiment.

DESCRIPTION OF EMBODIMENTS

Hereinafter, embodiments of the present disclosure will be described in detail with reference to the drawings. The same reference signs are applied to parts which are the same or corresponding in each of the drawings, and duplicated parts will be omitted.

First Embodiment

[Configuration of Optical Module]

Figure 1:
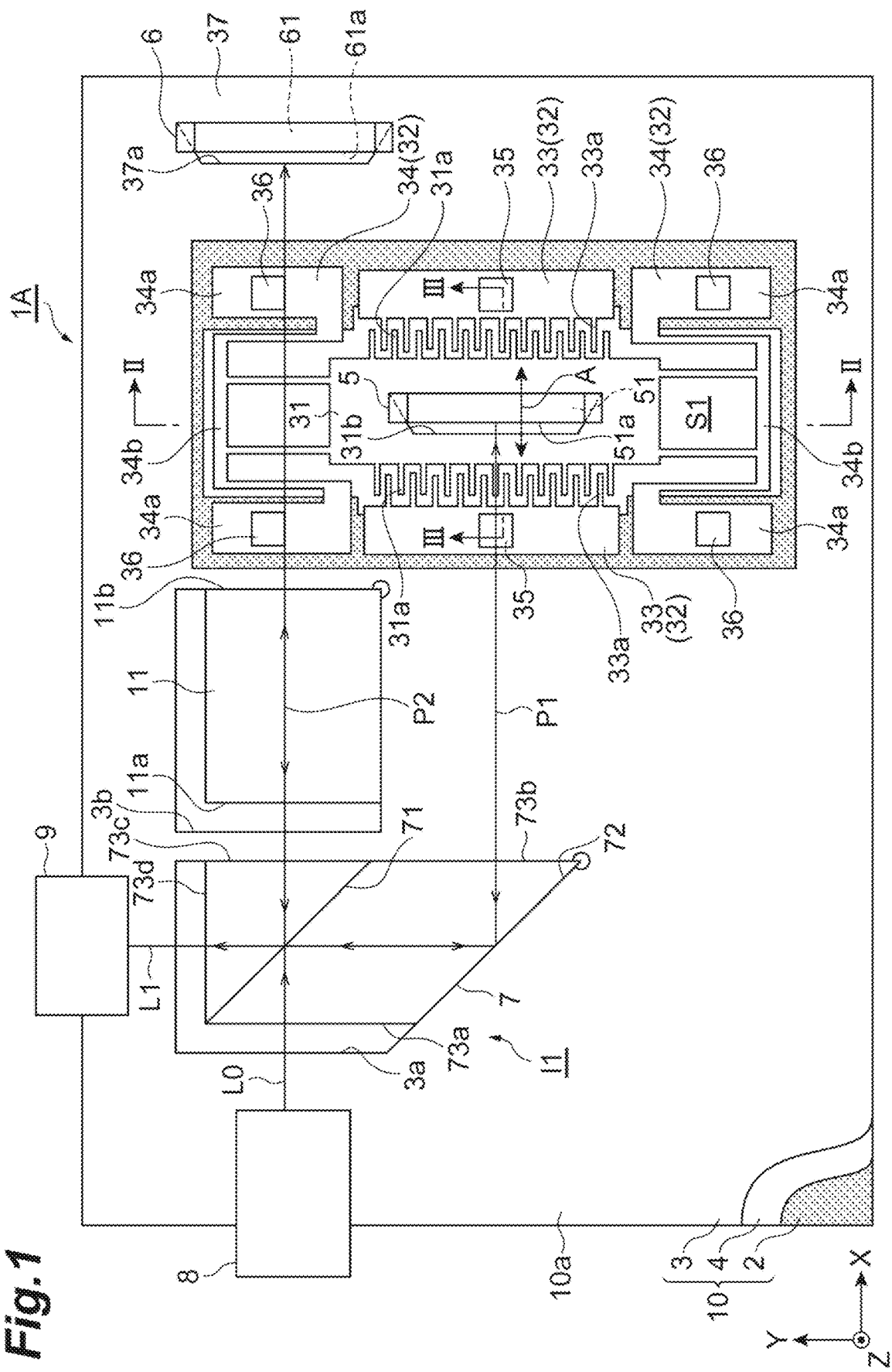
FIG. 1 is a plan view of an optical module of a first embodiment.

As illustrated in FIG. 1, an optical module 1A includes a base 10. The base 10 has a support layer 2, a device layer 3 which is provided on the support layer 2, and an intermediate layer 4 which is provided between the support layer 2 and the device layer 3. The support layer 2 supports the device layer 3 with the intermediate layer 4 interposed therebetween. The base 10 has a main surface 10a. The main surface 10a is a surface of the device layer 3 on a side opposite to the support layer 2. The support layer 2, the device layer 3, and the intermediate layer 4 are constituted of an SOI substrate. Specifically, the support layer 2 is a first silicon layer of the SOI substrate. The device layer 3 is a second silicon layer of the SOI substrate. The intermediate layer 4 is an insulating layer of the SOI substrate. The support layer 2, the device layer 3, and the intermediate layer 4 exhibit a rectangular shape of which one side is approximately 10 mm, for example, when viewed in a Z-axis direction (direction parallel to a Z-axis) that is a stacking direction (direction perpendicular to the main surface 10a, that is a third direction) thereof. The thickness of each of the support layer 2 and the device layer 3 is approximately several hundreds of μm, for example. The thickness of the intermediate layer 4 is approximately several μm, for example. FIG. 1 illustrates the device layer 3 and the intermediate layer 4 in a state where one corner portion of the device layer 3 and one corner portion of the intermediate layer 4 are cut out.

A mounting region 31 and a driving region 32 are provided in the device layer 3. The driving region 32 includes a pair of actuator regions 33 and a pair of elastic support regions 34. The mounting region 31 and the driving region 32 (that is, the mounting region 31, the pair of actuator regions 33, and the pair of elastic support regions 34) are integrally formed in a portion of the device layer 3 by a MEMS technology (patterning and etching).

The pair of actuator regions 33 are disposed on both sides of the mounting region 31 in an X-axis direction (direction parallel to an X-axis orthogonal to the Z-axis, that is, a first direction) parallel to the main surface 10a. That is, the mounting region 31 is disposed between the pair of actuator regions 33 in the X-axis direction. Each of the actuator regions 33 is fixed to the support layer 2 with the intermediate layer 4 interposed therebetween. A first comb-teeth portion 33a is provided on a side surface of each of the actuator regions 33 on the mounting region 31 side. Each of the first comb-teeth portions 33a is in a state of being detached with respect to the support layer 2 after the intermediate layer 4 immediately below thereof is removed. A first electrode 35 is provided in each of the actuator regions 33.

The pair of elastic support regions 34 are disposed on both sides of the mounting region 31 in a Y-axis direction (direction parallel to a Y-axis orthogonal to the Z-axis and the X-axis, that is, a second direction) parallel to the main surface 10a and perpendicular to the X-axis direction. That is, the mounting region 31 is disposed between the pair of elastic support regions 34 in the Y-axis direction. Both end portions 34a of each of the elastic support regions 34 are fixed to the support layer 2 with the intermediate layer 4 interposed therebetween. An elastic deformation portion 34b (part between both the end portions 34a) of each of the elastic support regions 34 has a structure in which a plurality of leaf springs are coupled. The elastic deformation portion 34b of each of the elastic support regions 34 is in a state of being detached with respect to the support layer 2 after the intermediate layer 4 immediately below thereof is removed. A second electrode 36 is provided in each of both the end portions 34a in each of the elastic support regions 34.

The elastic deformation portion 34b of each of the elastic support regions 34 is connected to the mounting region 31. The mounting region 31 is in a state of being detached with respect to the support layer 2 after the intermediate layer 4 immediately below thereof is removed. That is, the mounting region 31 is supported by the pair of elastic support regions 34. Second comb-teeth portions 31a are provided on side surfaces of the mounting region 31 on the actuator regions 33 side. Each of the second comb-teeth portions 31a is in a state of being detached with respect to the support layer 2 after the intermediate layer 4 immediately below thereof is removed. In the first comb-teeth portions 33a and the second comb-teeth portions 31a facing each other, each comb tooth of the first comb-teeth portions 33a is positioned between comb teeth of the second comb-teeth portions 31a.

The pair of elastic support regions 34 sandwich the mounting region 31 from both sides when viewed in a direction A parallel to the X-axis. When the mounting region 31 moves in the direction A, the pair of elastic support regions 34 cause an elastic force to act on the mounting region 31 such that the mounting region 31 returns to the initial position. Therefore, when a voltage is applied to a part between the first electrode 35 and the second electrode 36 such that an electrostatic attraction acts between the first comb-teeth portions 33a and the second comb-teeth portions 31a facing each other, the mounting region 31 moves in the direction A to a position where the electrostatic attraction and the elastic force of the pair of elastic support regions 34 are balanced. In this manner, the driving region 32 functions as an electrostatic actuator and moves the mounting region 31 in the X-axis direction.

The optical module 1A further includes a movable mirror 5, a fixed mirror (first fixed mirror) 6, a beam splitter unit 7, a measurement light incident unit 8, a measurement light emission unit 9, and a light transmitting member 11. The movable mirror 5, the fixed mirror 6, and the beam splitter unit 7 are disposed on the device layer 3 such that an interference optical system (first interference optical system) I1 is constituted for measurement light L0. Here, the interference optical system I1 is a Michelson interference optical system.

The movable mirror 5 is mounted in the mounting region 31 of the device layer 3. The movable mirror 5 has a mirror portion 51. The mirror portion 51 has a mirror surface 51a having a positional relationship of intersecting the main surface 10a. The mirror surface 51a is positioned on a side opposite to the support layer 2 with respect to the device layer 3. For example, the mirror surface 51a is a surface perpendicular to the X-axis direction (that is, a surface perpendicular to the direction A) and is directed to one side (beam splitter unit 7 side) in the X-axis direction.

The fixed mirror 6 is mounted in a mounting region 37 of the device layer 3. That is, the fixed mirror 6 is mounted on the base 10. The position of the fixed mirror 6 with respect to the base 10 (position with respect to a region of the base 10 excluding the mounting region 31 and the driving region 32) is fixed. The fixed mirror 6 is positioned on one side in the Y-axis direction with respect to the movable mirror 5. That is, the fixed mirror 6 deviates to one side in the Y-axis direction with respect to the movable mirror 5. At least a portion of the driving region 32 is positioned on one side of the fixed mirror 6 in the X-axis direction when viewed in the Z-axis direction. That is, at least a portion of the driving region 32 is arranged with the fixed mirror 6 in the X-axis direction when viewed in the Z-axis direction. Specifically, one elastic support region 34 of the driving region 32 is positioned on one side of the fixed mirror 6 in the X-axis direction when viewed in the Z-axis direction.

The fixed mirror 6 has a mirror portion 61. The mirror portion 61 has a mirror surface 61a having a positional relationship of intersecting the main surface 10a. The mirror surface 61a is positioned on a side opposite to the support layer 2 with respect to the device layer 3. For example, the mirror surface 61a is a surface perpendicular to the X-axis direction (that is, a surface perpendicular to the direction A) and is directed to one side (beam splitter unit 7 side) in the X-axis direction.

The beam splitter unit 7 is positioned on one side of the movable mirror 5 and the fixed mirror 6 in the X-axis direction. The beam splitter unit 7 is positionally aligned in the base 10 in a state where one corner portion on a bottom surface side in the beam splitter unit 7 is positioned at one corner in a rectangular opening 3a formed in the device layer 3. More specifically, the beam splitter unit 7 is positionally aligned in the base 10 when both side surfaces constituting the one corner portion in the beam splitter unit 7 are respectively brought into contact with both side surfaces leading to the one corner in the opening 3a. The beam splitter unit 7 is mounted in the support layer 2 by being fixed to the support layer 2 through bonding or the like in a positionally aligned state. That is, the beam splitter unit 7 is mounted on the base 10. Since a refuge is provided at the one corner in the opening 3a, the one corner portion in the beam splitter unit 7 does not come into contact with the one corner in the opening 3a.

The beam splitter unit 7 has a half mirror surface 71, a total reflection mirror surface 72, and a plurality of optical surfaces 73a, 73b, 73c, and 73d. The half mirror surface 71, the total reflection mirror surface 72, and the plurality of optical surfaces 73a, 73b, 73c, and 73d are positioned on a side opposite to the support layer 2 with respect to the device layer 3. The beam splitter unit 7 is constituted of a plurality of optical blocks which are joined to each other. For example, the half mirror surface 71 is formed of a dielectric multilayer film. For example, the total reflection mirror surface 72 is formed of a metal film.

For example, the optical surface 73a is a surface perpendicular to the X-axis direction and overlaps the mirror surface 61a of the fixed mirror 6 when viewed in the X-axis direction. The optical surface 73a allows the measurement light L0 incident in the X-axis direction to be transmitted therethrough.

For example, the half mirror surface 71 is a surface inclined with respect to the optical surface 73a by 45o and overlaps the mirror surface 61a of the fixed mirror 6 when viewed in the X-axis direction. The half mirror surface 71 reflects a portion of the measurement light L0, which has been incident on the optical surface 73a in the X-axis direction, in the Y-axis direction and allows the remaining portion of the measurement light L0 to be transmitted therethrough to the fixed mirror 6 side in the X-axis direction.

The total reflection mirror surface 72 is a surface parallel to the half mirror surface 71, overlaps the mirror surface 51a of the movable mirror 5 when viewed in the X-axis direction, and overlaps the half mirror surface 71 when viewed in the Y-axis direction. The total reflection mirror surface 72 reflects a portion of the measurement light L0, which has been reflected by the half mirror surface 71, to the movable mirror 5 side in the X-axis direction.

The optical surface 73b is a surface parallel to the optical surface 73a and overlaps the mirror surface 51a of the movable mirror 5 when viewed in the X-axis direction. The optical surface 73b allows a portion of the measurement light L0 reflected by the total reflection mirror surface 72 to be transmitted therethrough to the movable mirror 5 side in the X-axis direction.

The optical surface 73c is a surface parallel to the optical surface 73a and overlaps the mirror surface 61a of the fixed mirror 6 when viewed in the X-axis direction. The optical surface 73c allows the remaining portion of the measurement light L0 transmitted through the half mirror surface 71 to be transmitted therethrough to the fixed mirror 6 side in the X-axis direction.

For example, the optical surface 73d is a surface perpendicular to the Y-axis direction and overlaps the half mirror surface 71 and the total reflection mirror surface 72 when viewed in the Y-axis direction. The optical surface 73d allows measurement light L1 to be transmitted therethrough in the Y-axis direction. The measurement light L1 is interference light of a portion of the measurement light L0 which has been sequentially reflected by the mirror surface 51a of the movable mirror 5 and the total reflection mirror surface 72 and has been transmitted through the half mirror surface 71, and the remaining portion of the measurement light L0 which has been sequentially reflected by the mirror surface 61a of the fixed mirror 6 and the half mirror surface 71.

The measurement light incident unit 8 is disposed such that the measurement light L0 is incident on the interference optical system I1 from outside. The measurement light incident unit 8 is mounted in the device layer 3 on one side of the beam splitter unit 7 in the X-axis direction. The measurement light incident unit 8 faces the optical surface 73a of the beam splitter unit 7 in the X-axis direction. For example, the measurement light incident unit 8 is constituted of optical fibers and a collimating lens.

The measurement light emission unit 9 is disposed such that the measurement light L1 (interference light) is emitted from the interference optical system I1 to the outside. The measurement light emission unit 9 is mounted in the device layer 3 on one side of the beam splitter unit 7 in the Y-axis direction. The measurement light emission unit 9 faces the optical surface 73d of the beam splitter unit 7 in the Y-axis direction. For example, the measurement light emission unit 9 is constituted of optical fibers and a collimating lens.

The light transmitting member 11 is disposed between the beam splitter unit 7 and the fixed mirror 6. The light transmitting member 11 is positionally aligned in the base 10 in a state where one corner portion on a bottom surface side in the light transmitting member 11 is positioned at one corner in a rectangular opening 3b formed in the device layer 3. More specifically, the light transmitting member 11 is positionally aligned in the base 10 when both side surfaces constituting the one corner portion in the light transmitting member 11 are respectively brought into contact with both side surfaces leading to the one corner in the opening 3b. The light transmitting member 11 is mounted in the support layer 2 by being fixed to the support layer 2 through bonding or the like in a positionally aligned state. That is, the light transmitting member 11 is mounted on the base 10. Since a refuge is provided at the one corner in the opening 3b, the one corner portion in the light transmitting member 11 does not come into contact with the one corner in the opening 3b.

The light transmitting member 11 includes a pair of optical surfaces 11a and 11b. The pair of optical surfaces 11a and 11b are positioned on a side opposite to the support layer 2 with respect to the device layer 3. For example, each of the pair of optical surfaces 11a and 11b is a surface perpendicular to the X-axis direction. The pair of optical surfaces 11a and 11b are parallel to each other. The light transmitting member 11 corrects an optical path difference between an optical path (first optical path) P1 between the beam splitter unit 7 and the movable mirror 5, and an optical path (second optical path) P2 between the beam splitter unit 7 and the fixed mirror 6.

Specifically, the optical path P1 is an optical path leading to the mirror surface 51a of the movable mirror 5 positioned at a reference position from the half mirror surface 71 sequentially via the total reflection mirror surface 72 and the optical surface 73b. The optical path P1 is an optical path where a portion of the measurement light L0 travels. The optical path P2 is an optical path leading to the mirror surface 61a of the fixed mirror 6 from the half mirror surface 71 via the optical surface 73c. The optical path P2 is an optical path where the remaining portion of the measurement light L0 travels. The light transmitting member 11 corrects the optical path difference between the optical path P1 and the optical path P2 such that the difference between the optical path length of the optical path P1 (optical path length considering the index of refraction of each of media through which the optical path P1 passes) and the optical path length of the optical path P2 (optical path length considering the index of refraction of each of media through which the optical path P2 passes) becomes zero, for example.

The light transmitting member 11 is formed of the same light transmitting material as a light transmitting material (for example, glass) used for each of the optical blocks constituting the beam splitter unit 7. In the optical module 1A having a configuration described above, when the measurement light L0 is incident on the interference optical system I1 from outside via the measurement light incident unit 8, a portion of the measurement light L0 is sequentially reflected by the half mirror surface 71 and the total reflection mirror surface 72 of the beam splitter unit 7 and travels toward the mirror surface 51a of the movable mirror 5. Then, a portion of the measurement light L0 is reflected by the mirror surface 51a of the movable mirror 5, travels along the same optical path (that is, the optical path P1), and is transmitted through the half mirror surface 71 of the beam splitter unit 7.

Meanwhile, the remaining portion of the measurement light L0 is transmitted through the half mirror surface 71 of the beam splitter unit 7 and travels toward the mirror surface 61a of the fixed mirror 6. Then, the remaining portion of the measurement light L0 is reflected by the mirror surface 61a of the fixed mirror 6, travels along the same optical path (that is, the optical path P2), and is reflected by the half mirror surface 71 of the beam splitter unit 7.

A portion of the measurement light L0 transmitted through the half mirror surface 71 of the beam splitter unit 7 and the remaining portion of the measurement light L0 reflected by the half mirror surface 71 of the beam splitter unit 7 become the measurement light L1 (interference light), and the measurement light L1 is emitted from the interference optical system I1 to the outside via the measurement light emission unit 9. According to the optical module 1A, since the movable mirror 5 can reciprocate in the direction A at a high speed, it is possible to provide a small-sized FTIR having high accuracy.

[Movable Mirror and Surrounding Structure Thereof]

Figure 2:
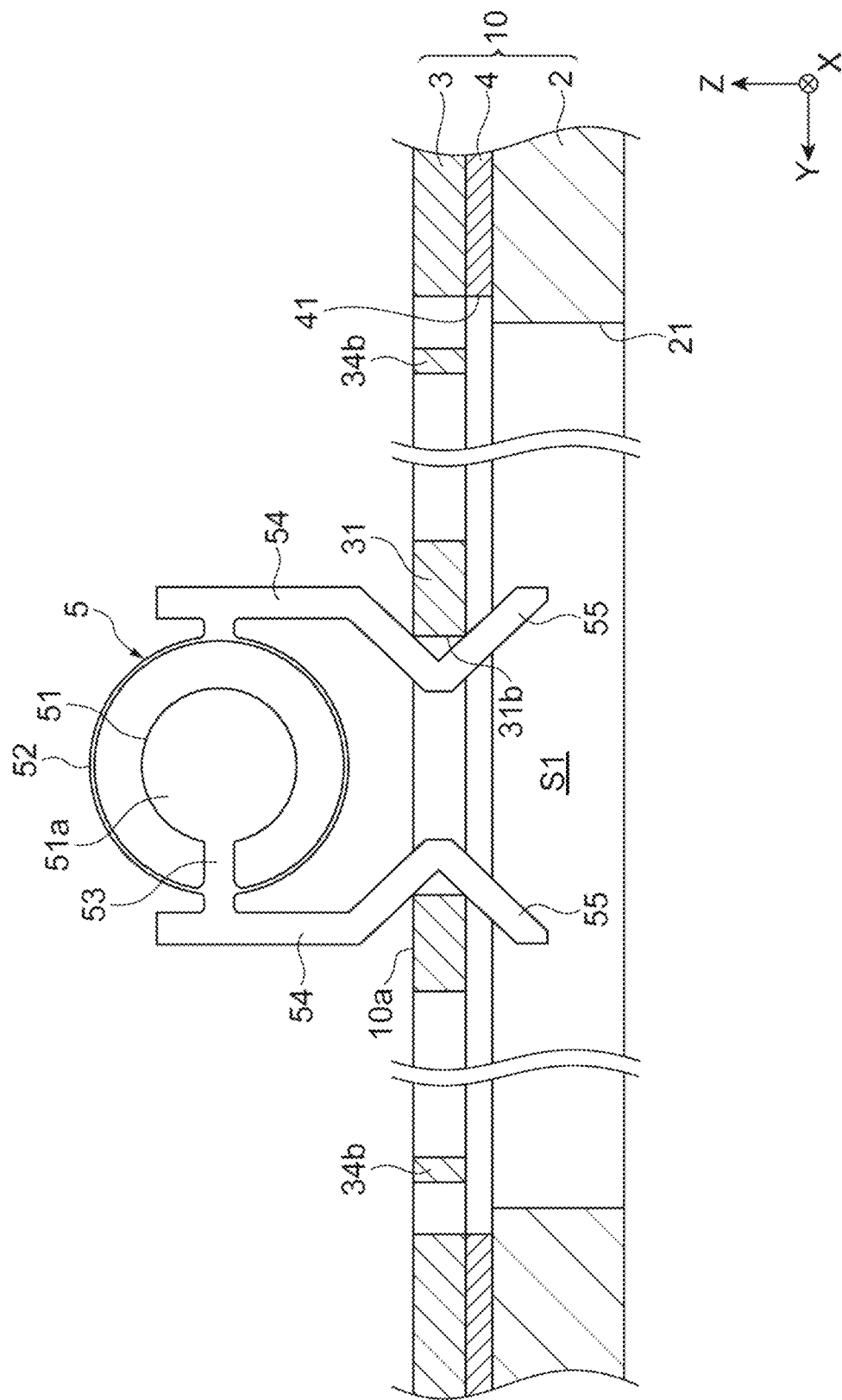
FIG. 2 is a cross-sectional view taken along line II-II in FIG. 1.
Figure 3:
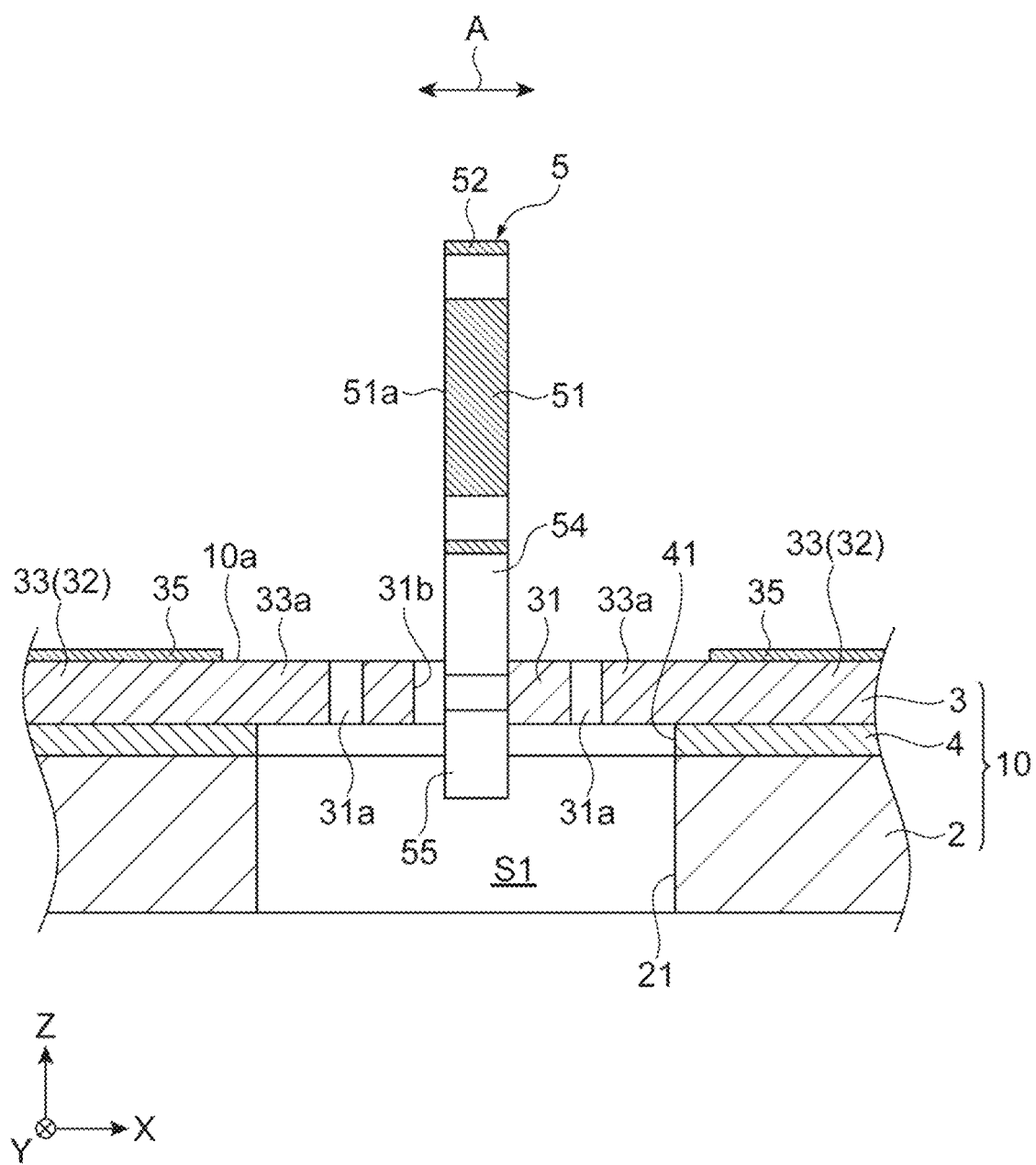
FIG. 3 is a cross-sectional view taken along line III-III in FIG. 1.

As illustrated in FIGS. 2 and 3, the movable mirror 5 has the mirror portion 51, an elastic portion 52, a coupling portion 53, a pair of leg portions (support portion) 54, and a pair of interlock portions (support portion) 55. The movable mirror 5 having a configuration described below is integrally formed by a MEMS technology (patterning and etching).

The mirror portion 51 is formed to have a plate shape (for example, a disk shape) having the mirror surface 51a as a main surface. The elastic portion 52 is formed to have an annular shape (for example, a circular shape) being separated from the mirror portion 51 and surrounding the mirror portion 51 when viewed in the X-axis direction (direction perpendicular to the mirror surface 51a). The coupling portion 53 causes the mirror portion 51 and the elastic portion 52 to be coupled to each other on one side in the Y-axis direction with respect to the center of the mirror portion 51 when viewed in the X-axis direction.

The pair of leg portions 54 are coupled to an outer surface of the elastic portion 52 on both sides in the Y-axis direction with respect to the center of the mirror portion 51 when viewed in the X-axis direction. That is, the mirror portion 51 and the elastic portion 52 are disposed between the pair of leg portions 54 in the Y-axis direction. Each of the leg portions 54 extends to the mounting region 31 side beyond the mirror portion 51 and the elastic portion 52. The pair of interlock portions 55 are respectively provided in end portions of the leg portions 54 on the mounting region 31 side. The interlock portions 55 are formed to be bent inward (toward each other) in a V-shape, for example, when viewed in the X-axis direction.

The movable mirror 5 having a configuration described above is mounted in the mounting region 31 when the pair of interlock portions 55 are disposed in an opening 31b formed in the mounting region 31. The opening 31b is open on both sides of the mounting region 31 in the Z-axis direction. A portion of each of the interlock portions 55 protrudes from a surface of the mounting region 31 on the intermediate layer 4 side. That is, the movable mirror 5 penetrates the mounting region 31.

Elastic forces act outward (away from each other) on the pair of interlock portions 55 disposed in the opening 31b of the mounting region 31, in accordance with elastic deformation of the elastic portion 52. That is, the pair of interlock portions 55 are inserted into the opening 31b in a state where an elastic force of the elastic portion 52 is applied. The elastic forces are generated due to the annular elastic portion 52 which is compressed when the movable mirror 5 is mounted in the mounting region 31 and has a tendency of being restored to the initial state. The movable mirror 5 is fixed to the mounting region 31 due to a reaction force of an elastic force applied from an inner surface of the opening 31b to the pair of interlock portions 55.

As illustrated in FIG. 1, the opening 31b is formed to have a trapezoidal shape widening toward the end on a side opposite to the beam splitter unit 7 when viewed in the Z-axis direction. When the pair of interlock portions 55 exhibiting inwardly bent shapes engage with the opening 31b exhibiting such a shape, the movable mirror 5 is positionally aligned (self-aligned) in each of the X-axis direction, the Y-axis direction, and the Z-axis direction in an automatic manner.

As illustrated in FIGS. 2 and 3, an opening 41 is formed in the intermediate layer 4. The opening 41 is open on both sides of the intermediate layer 4 in the Z-axis direction. An opening 21 is formed in the support layer 2. The opening 21 is open on both sides of the support layer 2 in the Z-axis direction. In the optical module 1A, a continuous space S1 is constituted of a region inside the opening 41 of the intermediate layer 4 and a region inside the opening 21 of the support layer 2. That is, the space S1 includes a region inside the opening 41 of the intermediate layer 4 and a region inside the opening 21 of the support layer 2.

The space S1 is formed between the support layer 2 and the device layer 3 and corresponds to at least the mounting region 31 and the driving region 32. Specifically, a region inside the opening 41 of the intermediate layer 4 and a region inside the opening 21 of the support layer 2 include a range in which the mounting region 31 moves when viewed in the Z-axis direction. A region inside the opening 41 of the intermediate layer 4 forms a clearance for causing a part (that is, a part to be in a detached state with respect to the support layer 2, for example, the mounting region 31 in its entirety, the elastic deformation portion 34b of each of the elastic support regions 34, the first comb-teeth portions 33a, and the second comb-teeth portions 31a) of the mounting region 31 and the driving region 32, which needs to be separated from the support layer 2, to be separated from the support layer 2. That is, the space S corresponding to at least the mounting region 31 and the driving region 32 means a space formed between the support layer 2 and the device layer 3 such that the mounting region 31 in its entirety and at least a portion of the driving region 32 are separated from the support layer 2.

A portion of each of the interlock portions 55 included in the movable mirror 5 is positioned in the space S1. Specifically, a portion of each of the interlock portions 55 is positioned in a region inside the opening 21 of the support layer 2 through a region inside the opening 41 of the intermediate layer 4. A portion of each of the interlock portions 55 protrudes into the space S1 from a surface of the device layer 3 on the intermediate layer 4 side by approximately 100 μm, for example. As described above, since a region inside the opening 41 of the intermediate layer 4 and a region inside the opening 21 of the support layer 2 include the range in which the mounting region 31 moves when viewed in the Z-axis direction, a portion of each of the interlock portions 55 of the movable mirror 5 positioned in the space S1 does not come into contact with the intermediate layer 4 and the support layer 2 when the mounting region 31 reciprocates in the direction A.

[Fixed Mirror and Surrounding Structure Thereof]

The fixed mirror 6 has a configuration similar to the movable mirror 5. As illustrated in FIG. 1, the fixed mirror 6 is mounted in the mounting region 37 when the pair of interlock portions are disposed in an opening 37a formed in the mounting region 37.

Actions and Effects

In the optical module 1A, the movable mirror 5 which has a mirror surface 51a having a positional relationship of intersecting the main surface 10a of the base 10 is mounted in the mounting region 31 of the base 10. Accordingly, the mirror surface 51a of the movable mirror 5 can be increased in size. Furthermore, in the optical module 1A, the mirror surface 51a of the movable mirror 5, which is mounted in the mounting region 31, and the mirror surface 61a of the fixed mirror 6, of which the position with respect to the base 10 is fixed, are directed to one side in the X-axis direction parallel to the main surface 10a of the base 10. Accordingly, for example, compared to a case where the mirror surface 51a of the movable mirror 5 and the mirror surface 61a of the fixed mirror 6 have a positional relationship of being orthogonal to each other, it is possible to easily measure whether or not an angular deviation of the mirror surface 51a of the movable mirror 5 is kept within a predetermined range with reference to the mirror surface 61a of the fixed mirror 6. From the above, according to the optical module 1A, the mirror surface 51a of the movable mirror 5 can be increased in size and whether or not an angular deviation of the mirror surface 51a of the movable mirror 5 is kept within a predetermined range can be easily measured.

In addition, in the optical module 1A, the movable mirror 5 is fixed to the mounting region 31 due to a reaction force of an elastic force applied from the inner surface of the opening 31b of the mounting region 31 to the interlock portions 55. Accordingly, for example, utilizing self-alignment, the movable mirror 5 can be easily mounted in the mounting region 31 with high accuracy. On the other hand, for example, it is concern that an angular deviation may occur on the mirror surface 51a of the movable mirror 5 due to particles sandwiched between the interlock portions 55 and the inner surface of the opening 31b. Therefore, as described above, a configuration capable of easily measuring whether or not an angular deviation of the mirror surface 51a of the movable mirror 5 is kept within a predetermined range is particularly effective.

In addition, in the optical module 1A, the fixed mirror 6 is positioned on one side in the Y-axis direction with respect to the movable mirror 5. At least a portion of the driving region 32 is positioned on one side of the fixed mirror 6 in the X-axis direction when viewed in the Z-axis direction. Accordingly, it is possible to achieve space saving within a plane parallel to the main surface 10a of the base 10 and to curb increase in size of the optical module 1A in its entirety.

In addition, in the optical module 1A, in the beam splitter unit 7, the half mirror surface 71 which reflects a portion of the measurement light L0 and allows the remaining portion of the measurement light L0 to be transmitted therethrough and the total reflection mirror surface 72 which reflects a portion of the measurement light L0 reflected by the half mirror surface 71 are parallel to each other. Accordingly, even if a deviation occurs in an attachment angle of the beam splitter unit 7 around an axis perpendicular to the main surface 10a of the base 10, as long as an incident angle of the measurement light L0 with respect to the beam splitter unit 7 (specifically, the optical surface 73a) is uniform, an emission angle of the measurement light L0 from the beam splitter unit 7 (specifically, the optical surface 73b) becomes uniform. Furthermore, in the optical module 1A, since the mirror surface 51a of the movable mirror 5 can be increased in size, even if a deviation occurs in an emission position of the measurement light L0 from the beam splitter unit 7, the deviation can be substantially disregarded. Thus, it is possible to alleviate the alignment accuracy of the beam splitter unit 7.

In addition, in the optical module 1A, the fixed mirror 6 is mounted on the base 10. Accordingly, it is possible to facilitate the positional alignment of the movable mirror 5 and the fixed mirror 6.

In addition, in the optical module 1A, the beam splitter unit 7 is mounted on the base 10. Accordingly, it is possible to facilitate the positional alignment of the movable mirror 5 and the beam splitter unit 7.

In addition, in the optical module 1A, the light transmitting member 11 is disposed on the optical path P1 and corrects the optical path difference between the optical path P1 and the optical path P2. Accordingly, it is possible to easily obtain interference light (measurement light L) of the measurement light L0 with high accuracy.

In addition, in the optical module 1A, the light transmitting member 11 is mounted on the base 10. Accordingly, it is possible to facilitate the positional alignment of the movable mirror 5 and the light transmitting member 11.

In addition, in the optical module 1A, the measurement light incident unit 8 is disposed such that the measurement light L0 is incident on the interference optical system I1 from outside. The measurement light emission unit 9 is disposed such that the measurement light L1 is emitted from the interference optical system I1 to the outside. Accordingly, it is possible to obtain an FTIR including the measurement light incident unit 8 and the measurement light emission unit 9.

In addition, in the optical module 1A, the base 10 is constituted of an SOI substrate. Accordingly, it is possible to favorably realize a configuration for reliable movement of the movable mirror 5 mounted in the device layer 3 using the SOI substrate.

Modification Example of First Embodiment

As illustrated in (a) of FIG. 4, the fixed mirror 6 may be provided in an optical surface 11b of the light transmitting member 11. In addition, as illustrated in (b) of FIG. 4, the mirror surface 51a of the movable mirror 5 and the mirror surface 61a of the fixed mirror 6 may be positioned on the same plane. In this case, the light transmitting member 11 may be disposed between the beam splitter unit 7 and the movable mirror 5, and a light transmitting member 17 may be disposed between the beam splitter unit 7 and the fixed mirror 6.

The light transmitting member 17 includes optical surfaces 17a and 17b and total reflection mirror surfaces 17c and 17d. For example, the optical surface 17a is a surface perpendicular to the X-axis direction. The optical surface 17a allows the remaining portion of the measurement light L0 incident in the X-axis direction to be transmitted therethrough. For example, the total reflection mirror surface 17c is a surface inclined with respect to the optical surface 17a by 45°. The total reflection mirror surface 17c reflects the remaining portion of the measurement light L0, which has been incident on the optical surface 17a in the X-axis direction, in the Y-axis direction. The total reflection mirror surface 17d is a surface parallel to the total reflection mirror surface 17c. The total reflection mirror surface 17d reflects the remaining portion of the measurement light L0, which has been reflected by the total reflection mirror surface 17c, to the fixed mirror 6 side in the X-axis direction. The optical surface 17b is a surface parallel to the optical surface 17a. The optical surface 17b allows the remaining portion of the measurement light L0 incident in the X-axis direction to be transmitted therethrough.

In the configuration illustrated in (b) of FIG. 4, the light transmitting member 11 and the light transmitting member 17 correct the optical path difference between the optical path P1 between the beam splitter unit 7 and the movable mirror 5, and the optical path P2 between the beam splitter unit 7 and the fixed mirror 6.

Second Embodiment

Figure 5:
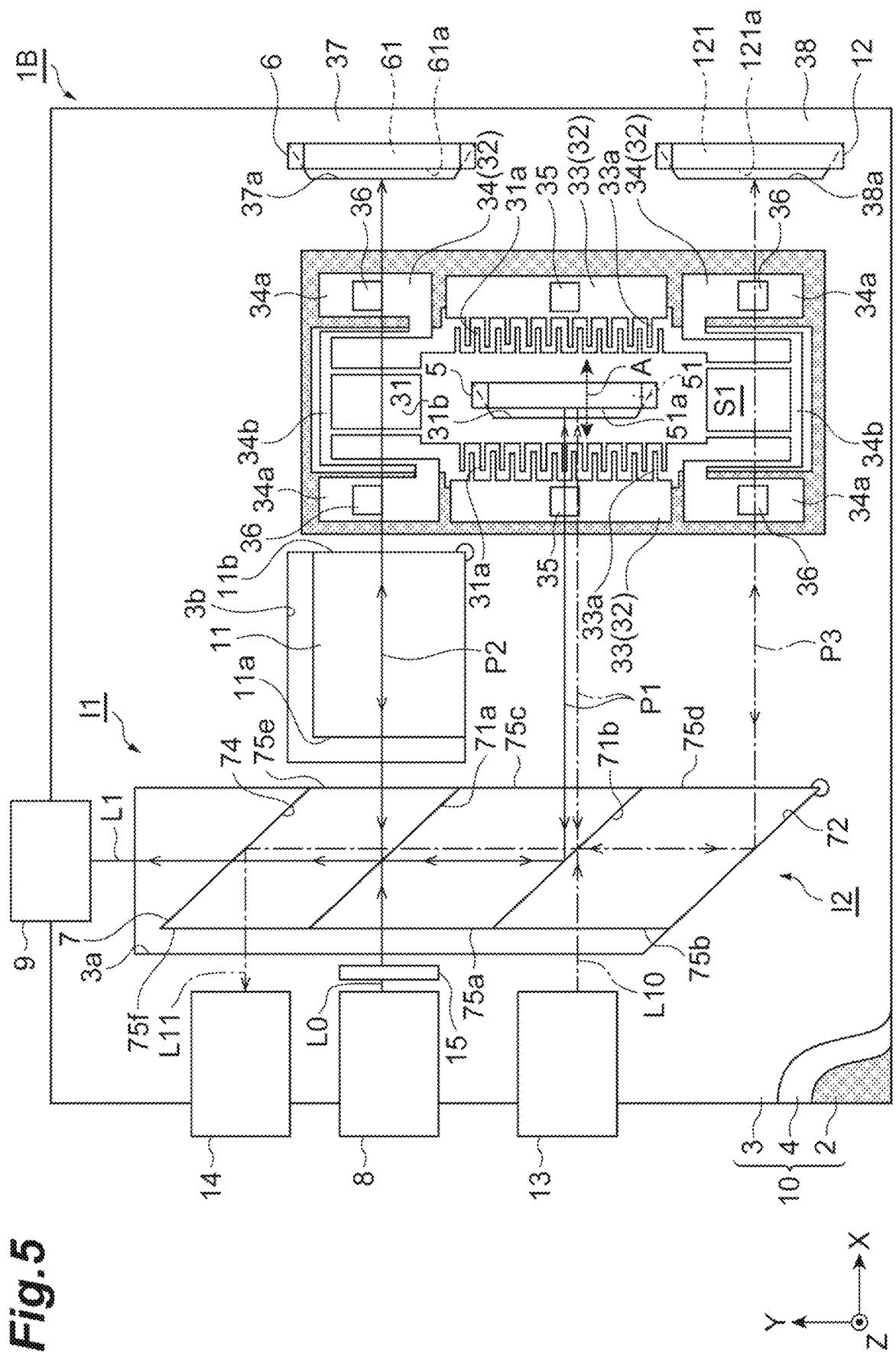
FIG. 5 is a plan view of an optical module of a second embodiment.

As illustrated in FIG. 5, an optical module 1B mainly differs from the optical module 1A described above in further including a fixed mirror (second fixed mirror) 12, a light source 13, a light detector 14, and a filter 15. In the optical module 1B, the movable mirror 5, the fixed mirror 6, and the beam splitter unit 7 are disposed on the device layer 3 such that the interference optical system (first interference optical system) I1 is constituted for the measurement light L0. In addition, in the optical module 1B, the movable mirror 5, the fixed mirror 12, and the beam splitter unit 7 are disposed on the device layer 3 such that an interference optical system (second interference optical system) I2 is constituted for laser light L10. Here, the interference optical systems I1 and I2 are Michelson interference optical systems.

The fixed mirror 12 is mounted in a mounting region 38 of the device layer 3. That is, the fixed mirror 12 is mounted on the base 10. The position of the fixed mirror 12 with respect to the base 10 (position with respect to a region of the base 10 excluding the mounting region 31 and the driving region 32) is fixed. The fixed mirror 12 is positioned on the other side (side opposite to one side to which the fixed mirror 6 deviates) in the Y-axis direction with respect to the movable mirror 5. That is, the fixed mirror 12 deviates to the other side in the Y-axis direction with respect to the movable mirror 5.

In the optical module 1B, the fixed mirrors 6 and 12 are positioned on both sides in the Y-axis direction with respect to the movable mirror 5. At least a portion of the driving region 32 is positioned on one side of the fixed mirror 6 in the X-axis direction and on one side of the fixed mirror 12 in the X-axis direction when viewed in the Z-axis direction. That is, at least a portion of the driving region 32 is arranged with each of the fixed mirrors 6 and 12 in the X-axis direction when viewed in the Z-axis direction. Specifically, one elastic support region 34 of the driving region 32 is positioned on one side of the fixed mirror 6 in the X-axis direction when viewed in the Z-axis direction. In addition, the other elastic support region 34 of the driving region 32 is positioned on one side of the fixed mirror 12 in the X-axis direction when viewed in the Z-axis direction.

The fixed mirror 12 has a mirror portion 121. The mirror portion 121 has a mirror surface 121a having a positional relationship of intersecting the main surface 10a. The mirror surface 121a is positioned on a side opposite to the support layer 2 with respect to the device layer 3. For example, the mirror surface 121a is a surface perpendicular to the X-axis direction (that is, a surface perpendicular to the direction A) and is directed to one side (beam splitter unit 7 side) in the X-axis direction. The fixed mirror 12 has a configuration similar to that of the movable mirror 5 and is mounted in the mounting region 38 when the pair of interlock portions are disposed in an opening 38a formed in the mounting region 38.

The beam splitter unit 7 has a plurality of half mirror surfaces 71a and 71b, the total reflection mirror surface 72, a dichroic mirror surface 74, and a plurality of optical surfaces 75a, 75b, 75c, 75d, 75e, and 75f. The plurality of half mirror surfaces 71a and 71b, the total reflection mirror surface 72, the dichroic mirror surface 74, and the plurality of optical surfaces 75a, 75b, 75c, 75d, 75e, and 75f are positioned on a side opposite to the support layer 2 with respect to the device layer 3. The beam splitter unit 7 is constituted of a plurality of optical blocks which are joined to each other. For example, each of the half mirror surfaces 71a and 71b is formed of a dielectric multilayer film. For example, the total reflection mirror surface 72 is formed of a metal film. For example, the dichroic mirror surface 74 is formed of a dielectric multilayer film.

For example, the optical surface 75a is a surface perpendicular to the X-axis direction and overlaps the mirror surface 61a of the fixed mirror 6 when viewed in the X-axis direction. The optical surface 75a allows the measurement light L0 incident in the X-axis direction to be transmitted therethrough.

For example, the half mirror surface 71a is a surface inclined with respect to the optical surface 75a by 45° and overlaps the mirror surface 61a of the fixed mirror 6 when viewed in the X-axis direction. The half mirror surface 71a reflects a portion of the measurement light L0, which has been incident on the optical surface 75a in the X-axis direction, in the Y-axis direction and allows the remaining portion of the measurement light L0 to be transmitted therethrough to the fixed mirror 6 side in the X-axis direction.

For example, the optical surface 75b is a surface perpendicular to the X-axis direction and overlaps the mirror surface 51a of the movable mirror 5 when viewed in the X-axis direction. The optical surface 75b allows the laser light L10 incident in the X-axis direction to be transmitted therethrough.

The half mirror surface 71b is a surface parallel to the half mirror surface 71a, overlaps the mirror surface 51a of the movable mirror 5 when viewed in the X-axis direction, and overlaps the half mirror surface 71a when viewed in the Y-axis direction. The half mirror surface 71b reflects a portion of the laser light L10, which has been incident on the optical surface 75b in the X-axis direction, in the Y-axis direction and allows the remaining portion of the laser light L10 to be transmitted therethrough to the movable mirror 5 side in the X-axis direction. The half mirror surface 71b reflects a portion of the measurement light L0, which has been reflected by the half mirror surface 71a, to the movable mirror 5 side in the X-axis direction.

The total reflection mirror surface 72 is a surface parallel to the half mirror surfaces 71a and 71b, overlaps the mirror surface 121a of the fixed mirror 12 when viewed in the X-axis direction, and overlaps the half mirror surfaces 71a and 71b when viewed in the Y-axis direction. The total reflection mirror surface 72 reflects a portion of the laser light L10, which has been reflected by the half mirror surface 71b, to the fixed mirror 12 side in the X-axis direction.

The optical surface 75c is a surface parallel to the optical surfaces 75a and 75b and overlaps the mirror surface 51a of the movable mirror 5 when viewed in the X-axis direction. The optical surface 75c allows a portion of the measurement light L0 reflected by the half mirror surface 71b and the remaining portion of the laser light L10 transmitted through the half mirror surface 71b to be transmitted therethrough to the movable mirror 5 side in the X-axis direction.

The optical surface 75d is a surface parallel to the optical surfaces 75a and 75b and overlaps the mirror surface 121a of the fixed mirror 12 when viewed in the X-axis direction. The optical surface 75d allows a portion of the laser light L10 reflected by the total reflection mirror surface 72 to be transmitted therethrough to the fixed mirror 12 side in the X-axis direction.

The optical surface 75e is a surface parallel to the optical surfaces 75a and 75b and overlaps the mirror surface 61a of the fixed mirror 6 when viewed in the X-axis direction. The optical surface 75e allows the remaining portion of the measurement light L0 transmitted through the half mirror surface 71a to be transmitted therethrough to the fixed mirror 6 side in the X-axis direction.

The dichroic mirror surface 74 is a surface parallel to the half mirror surfaces 71a and 71b and the total reflection mirror surface 72 and overlaps the half mirror surfaces 71a and 71b and the total reflection mirror surface 72 when viewed in the Y-axis direction. The dichroic mirror surface 74 allows the measurement light L1 to be transmitted therethrough in the Y-axis direction and reflects laser light L11 in the X-axis direction. The measurement light L1 is interference light of a portion of the measurement light L0 which has been sequentially reflected by the mirror surface 51a of the movable mirror 5 and the half mirror surface 71b and has been transmitted through the half mirror surface 71a, and the remaining portion of the measurement light L0 which has been sequentially reflected by the mirror surface 61a of the fixed mirror 6 and the half mirror surface 71a. The laser light L11 is interference light of a portion of the laser light L10 which has been sequentially reflected by the mirror surface 121a of the fixed mirror 12 and the total reflection mirror surface 72 and has been sequentially transmitted through the half mirror surface 71b and the half mirror surface 71a, and the remaining portion of the laser light L10 which has been sequentially reflected by the mirror surface 51a of the movable mirror 5 and the half mirror surface 71b and has been transmitted through the half mirror surface 71a.

The optical surface 75f is a surface parallel to the optical surfaces 75c, 75d, and 75e and overlaps the dichroic mirror surface 74 when viewed in the X-axis direction. The optical surface 75f allows the laser light L11 reflected by the dichroic mirror surface 74 to be transmitted therethrough in the X-axis direction.

The measurement light incident unit 8 is disposed such that the measurement light L0 is incident on the interference optical system I1 from outside. The measurement light incident unit 8 is mounted in the device layer 3 on one side of the beam splitter unit 7 in the X-axis direction. The measurement light incident unit 8 faces the optical surface 75a of the beam splitter unit 7 in the X-axis direction. For example, the measurement light incident unit 8 is constituted of optical fibers and a collimating lens.

The measurement light emission unit 9 is disposed such that the measurement light L1 is emitted from the interference optical system I1 to the outside. The measurement light emission unit 9 is mounted in the device layer 3 on one side of the beam splitter unit 7 in the Y-axis direction. The measurement light emission unit 9 faces the dichroic mirror surface 74 of the beam splitter unit 7 in the Y-axis direction. For example, the measurement light emission unit 9 is constituted of optical fibers and a collimating lens.

The light source 13 generates the laser light L10 to be incident on the interference optical system I2. For example, the light source 13 is a laser diode. The light source 13 is mounted in the device layer 3 on one side of the beam splitter unit 7 in the X-axis direction. The light source 13 faces the optical surface 75b of the beam splitter unit 7 in the X-axis direction.

The light detector 14 detects the laser light L11 emitted from the interference optical system I2. For example, the light detector 14 is a photodiode. The light detector 14 is mounted in the device layer 3 on one side of the beam splitter unit 7 in the X-axis direction. The light detector 14 faces the optical surface 75f of the beam splitter unit 7 in the X-axis direction.

The filter 15 is disposed on an optical path where the laser light L10 does not travel and the measurement light L0 travels. Specifically, the filter 15 is disposed between the measurement light incident unit 8 and the beam splitter unit 7. The filter 15 cuts light within a wavelength range including a center wavelength of the laser light L10.

In the optical module 1B having a configuration described above, when the measurement light L0 is incident on the interference optical system I1 from outside via the measurement light incident unit 8 and the filter 15, a portion of the measurement light L0 is sequentially reflected by the half mirror surface 71a and the half mirror surface 71b of the beam splitter unit 7 and travels toward the mirror surface 51a of the movable mirror 5. Then, a portion of the measurement light L0 is reflected by the mirror surface 51a of the movable mirror 5, travels along the same optical path (that is, the optical path P1), and is transmitted through the half mirror surface 71a of the beam splitter unit 7.

Meanwhile, the remaining portion of the measurement light L0 is transmitted through the half mirror surface 71a of the beam splitter unit 7 and travels toward the mirror surface 61a of the fixed mirror 6. Then, the remaining portion of the measurement light L0 is reflected by the mirror surface 61a of the fixed mirror 6, travels along the same optical path (that is, the optical path P2), and is reflected by the half mirror surface 71a of the beam splitter unit 7.

A portion of the measurement light L0 transmitted through the half mirror surface 71a of the beam splitter unit 7 and the remaining portion of the measurement light L0 reflected by the half mirror surface 71a of the beam splitter unit 7 become the measurement light L1 (interference light), and the measurement light L1 is transmitted through the dichroic mirror surface 74 of the beam splitter unit 7 and is emitted from the interference optical system I1 to the outside via the measurement light emission unit 9.

In addition, in the optical module 1B, when the laser light L0 is incident on the interference optical system I2 from the light source 13, a portion of the laser light L10 is sequentially reflected by the half mirror surface 71b of the beam splitter unit 7 and the total reflection mirror surface 72 and travels toward the mirror surface 121a of the fixed mirror 12. Then, a portion of the laser light L0 is reflected by the mirror surface 121a of the fixed mirror 12, travels along the same optical path (that is, an optical path P3 (third optical path) between the beam splitter unit 7 and the fixed mirror 12), and is transmitted through the half mirror surface 71b of the beam splitter unit 7.

Meanwhile, the remaining portion of the laser light L10 is transmitted through the half mirror surface 71b of the beam splitter unit 7 and travels toward the mirror surface 51a of the movable mirror 5. Then, the remaining portion of the laser light L10 is reflected by the mirror surface 51a of the movable mirror 5, travels along the same optical path (that is, the optical path P1), and is reflected by the half mirror surface 71b of the beam splitter unit 7.

A portion of the laser light L10 transmitted through the half mirror surface 71b of the beam splitter unit 7 and the remaining portion of the laser light L10 reflected by the half mirror surface 71b of the beam splitter unit 7 become the laser light L11 (interference light). After being transmitted through the half mirror surface 71a of the beam splitter unit 7, the laser light L11 is reflected by the dichroic mirror surface 74 of the beam splitter unit 7, is emitted from the interference optical system I2, and is detected by the light detector 14. According to the optical module 1B, since the position of the movable mirror 5 can be detected in real time by detecting the laser light L11, it is possible to provide an FTIR having higher accuracy.

Figure 6:
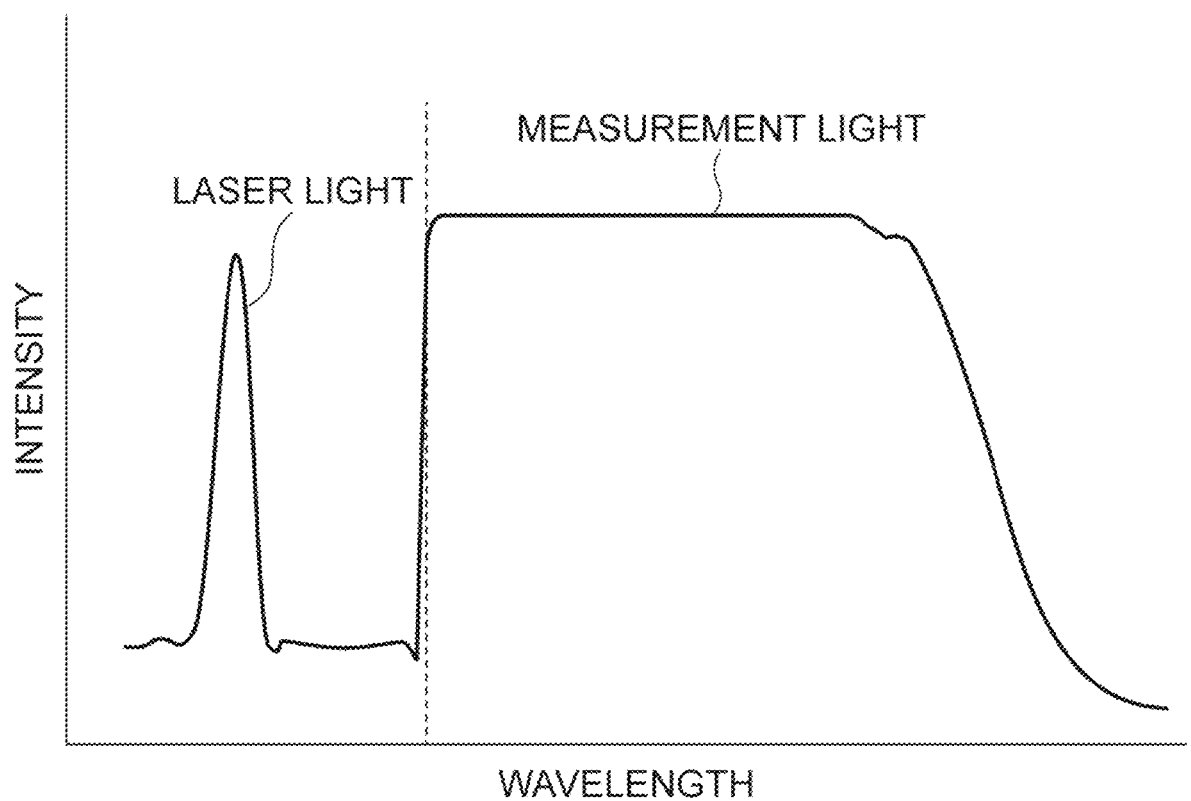
FIG. 6 is a view illustrating a spectrum of light incident on a light detector of the optical module in FIG. 5.

In the optical module 1B, the filter 15 disposed between the measurement light incident unit 8 and the beam splitter unit 7 cuts light (for example, the measurement light L0 having a wavelength range of 1 m or smaller) within a wavelength range including the center wavelength of the laser light L10 from the measurement light L0. Accordingly, as illustrated in FIG. 6, regarding light incident on the light detector 14, the laser light L11 and the measurement light L1 are prevented from being mixed.

Actions and Effects

According to the optical module 1B, for a reason similar to that of the optical module 1A described above, the mirror surface 51a of the movable mirror 5 can be increased in size and whether or not an angular deviation of the mirror surface 51a of the movable mirror 5 is kept within a predetermined range can be easily measured.

In addition, in the optical module 1B, the fixed mirrors 6 and 12 are respectively positioned on both sides in the Y-axis direction with respect to the movable mirror 5. At least a portion of the driving region 32 is positioned on one side of the fixed mirror 6 in the X-axis direction and on one side of the fixed mirror 12 in the X-axis direction when viewed in the Z-axis direction. Accordingly, it is possible to achieve space saving within a plane parallel to the main surface 10a of the base 10 and to curb increase in size of the optical module 1B in its entirety.

In addition, in the optical module 1B, the filter 15 which cuts light within a wavelength range including the center wavelength of the laser light L10 is disposed on an optical path where the laser light L10 does not travel and the measurement light L0 travels. Accordingly, it is possible to prevent the measurement light L1 from becoming noise in detection of interference light (laser light L11) of the laser light L10.

In addition, the optical module 1B includes the light source 13 which generates the laser light L10 to be incident on the interference optical system I2, and the light detector 14 which detects the laser light L11 emitted from the interference optical system I2. Accordingly, since the position of the movable mirror 5 can be detected in real time by detecting the laser light L11, it is possible to obtain an FTIR having higher accuracy.

Modification Example of Second Embodiment

Figure 7:
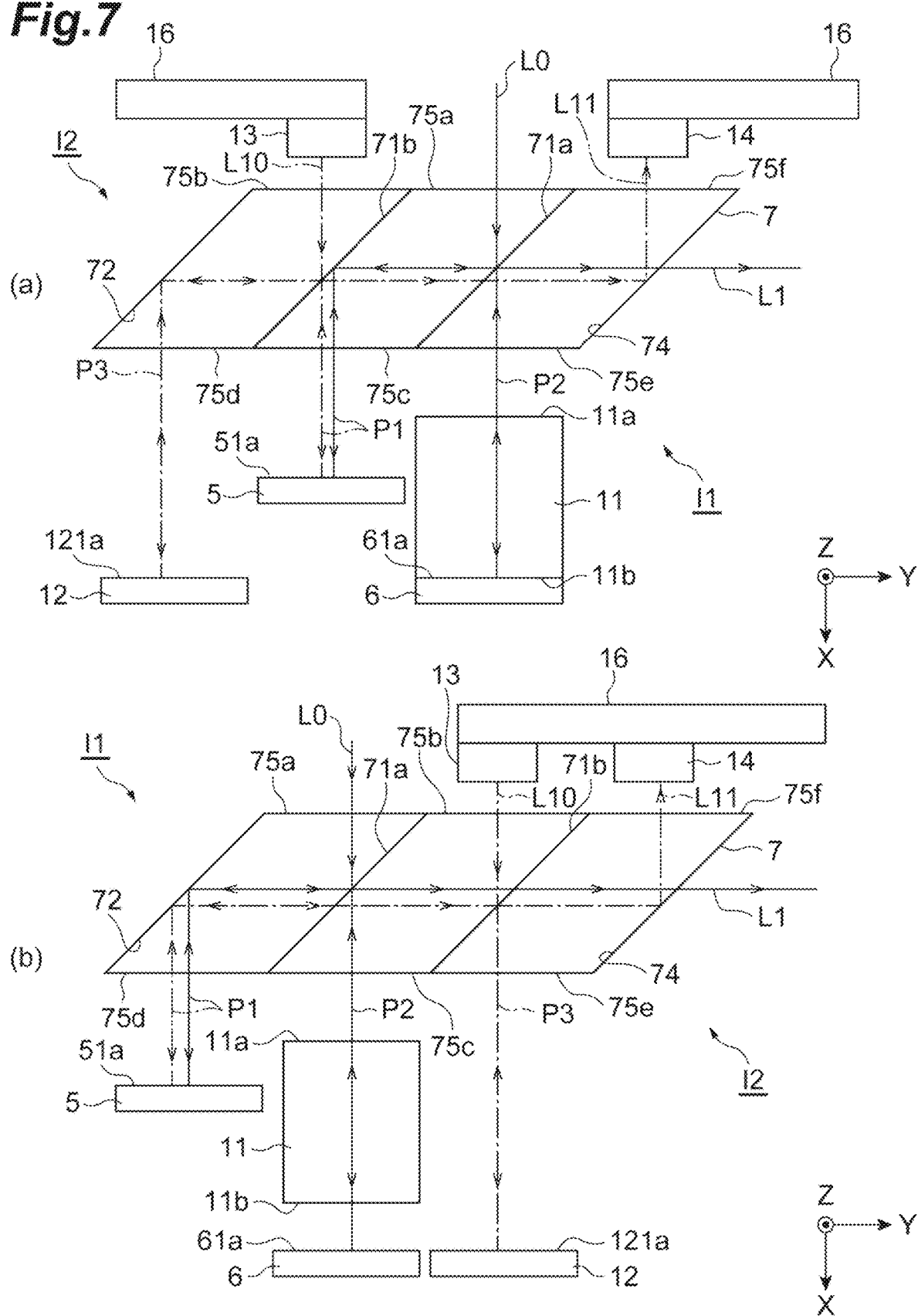
FIG. 7 is a schematic view illustrating a modification example of the second embodiment.

As illustrated in (a) and (b) of FIG. 7, the light source 13 and the light detector 14 may be mounted on a circuit board 16 which is provided separately from the base 10. In addition; as illustrated in (a) of FIG. 7, the fixed mirror 6 may be provided on the optical surface 11b of the light transmitting member 11. In addition, as illustrated in (b) of FIG. 7, the fixed mirrors 6 and 12 may be positioned on one side in the Y-axis direction with respect to the movable mirror 5. In this case, the beam splitter unit 7 may be constituted as follows.

In the beam splitter unit 7 illustrated in (b) of FIG. 7, for example, the optical surface 75a is a surface perpendicular to the X-axis direction and overlaps the mirror surface 61a of the fixed mirror 6 when viewed in the X-axis direction. The optical surface 75a allows the measurement light L0 incident in the X-axis direction to be transmitted therethrough.

For example, the half mirror surface 71a is a surface inclined with respect to the optical surface 75a by 450 and overlaps the mirror surface 61a of the fixed mirror 6 when viewed in the X-axis direction. The half mirror surface 71a reflects a portion of the measurement light L0, which has been incident on the optical surface 75a in the X-axis direction, in the Y-axis direction and allows the remaining portion of the measurement light L0 to be transmitted therethrough to the fixed mirror 6 side in the X-axis direction.

For example, the optical surface 75b is a surface perpendicular to the X-axis direction and overlaps the mirror surface 121a of the fixed mirror 12 when viewed in the X-axis direction. The optical surface 75b allows the laser light L10 incident in the X-axis direction to be transmitted therethrough.

The half mirror surface 71b is a surface parallel to the half mirror surface 71a, overlaps the mirror surface 121a of the fixed mirror 12 when viewed in the X-axis direction, and overlaps the half mirror surface 71a when viewed in the Y-axis direction. The half mirror surface 71b reflects a portion of the laser light L10, which has been incident on the optical surface 75b in the X-axis direction, in the Y-axis direction and allows the remaining portion of the laser light L10 to be transmitted therethrough to the fixed mirror 12 side in the X-axis direction. The half mirror surface 71a allows a portion of the laser light L10 reflected by the half mirror surface 71b to be transmitted therethrough in the Y-axis direction.

The total reflection mirror surface 72 is a surface parallel to the half mirror surfaces 71a and 71b, overlaps the mirror surface 51a of the movable mirror 5 when viewed in the X-axis direction, and overlaps the half mirror surfaces 71a and 71b when viewed in the Y-axis direction. The total reflection mirror surface 72 reflects a portion of the measurement light L0 reflected by the half mirror surface 71a and a portion of the laser light L10, which has been reflected by the half mirror surface 71b, to the movable mirror 5 side in the X-axis direction.

The optical surface 75c is a surface parallel to the optical surfaces 75a and 75b and overlaps the mirror surface 61a of the fixed mirror 6 when viewed in the X-axis direction. The optical surface 75c allows the remaining portion of the measurement light L0 transmitted through the half mirror surface 71a to be transmitted therethrough to the fixed mirror 6 side in the X-axis direction.

The optical surface 75d is a surface parallel to the optical surfaces 75a and 75b and overlaps the mirror surface 51a of the movable mirror 5 when viewed in the X-axis direction. The optical surface 75d allows a portion of the measurement light L0 and a portion of the laser light L10 reflected by the total reflection mirror surface 72 to be transmitted therethrough to the movable mirror 5 side in the X-axis direction.

The optical surface 75e is a surface parallel to the optical surfaces 75a and 75b and overlaps the mirror surface 121a of the fixed mirror 12 when viewed in the X-axis direction. The optical surface 75e allows the remaining portion of the laser light L10 transmitted through the half mirror surface 71a to be transmitted therethrough to the fixed mirror 12 side in the X-axis direction.

The dichroic mirror surface 74 is a surface parallel to the half mirror surfaces 71a and 71b and the total reflection mirror surface 72 and overlaps the half mirror surfaces 71a and 71b and the total reflection mirror surface 72 when viewed in the Y-axis direction. The dichroic mirror surface 74 allows the measurement light L1 to be transmitted therethrough in the Y-axis direction and reflects the laser light L11 in the X-axis direction. The measurement light L1 is interference light of a portion of the measurement light L0 which has been sequentially reflected by the mirror surface 51a of the movable mirror 5 and the total reflection mirror surface 72 and has been sequentially transmitted through the half mirror surfaces 71a and 71b, and the remaining portion of the measurement light L0 which has been sequentially reflected by the mirror surface 61a of the fixed mirror 6 and the half mirror surface 71a and has been transmitted through the half mirror surface 71b. The laser light L11 is interference light of a portion of the laser light L10 which has been sequentially reflected by the mirror surface 51a of the movable mirror 5 and the total reflection mirror surface 72 and has been sequentially transmitted through the half mirror surfaces 71a and 71b, and the remaining portion of the laser light L10 which has been sequentially reflected by the mirror surface 121a of the fixed mirror 12 and the half mirror surface 71b.

The optical surface 75f is a surface parallel to the optical surfaces 75c, 75d, and 75e and overlaps the dichroic mirror surface 74 when viewed in the X-axis direction. The optical surface 75f allows the laser light L11 reflected by the dichroic mirror surface 74 to be transmitted therethrough in the X-axis direction.

In addition, as illustrated in (a) of FIG. 8, the movable mirror 5, the fixed mirror 6, and the beam splitter unit 7 may constitute the interference optical system I1 for the measurement light L0 and may also constitute the interference optical system I2 for the laser light L10. In this case, the beam splitter unit 7 may be constituted as follows.

In the beam splitter unit 7 illustrated in (a) of FIG. 8, for example, the optical surface 75a is a surface perpendicular to the X-axis direction and overlaps the mirror surface 61a of the fixed mirror 6 when viewed in the X-axis direction. The optical surface 75a allows the measurement light L0 incident in the X-axis direction to be transmitted therethrough.

For example, the half mirror surface 71a is a surface inclined with respect to the optical surface 75a by 45° and overlaps the mirror surface 61a of the fixed mirror 6 when viewed in the X-axis direction. The half mirror surface 71a reflects a portion of the measurement light L0, which has been incident on the optical surface 75a in the X-axis direction, in the Y-axis direction and allows the remaining portion of the measurement light L0 to be transmitted therethrough to the fixed mirror 6 side in the X-axis direction.

For example, the optical surface 75b is a surface perpendicular to the X-axis direction and is positioned on one side of the optical surface 75a in the Y-axis direction. The optical surface 75b allows the laser light L10 incident in the X-axis direction to be transmitted therethrough.

The half mirror surface 71b is a surface parallel to the half mirror surface 71a, overlaps the optical surface 75b when viewed in the X-axis direction, and overlaps the half mirror surface 71a when viewed in the Y-axis direction. The half mirror surface 71b reflects the laser light L10, which has been incident on the optical surface 75b in the X-axis direction, in the Y-axis direction. The half mirror surface 71a allows a portion of the laser light L10 reflected by the half mirror surface 71b to be transmitted therethrough in the Y-axis direction and reflects the remaining portion of the laser light L10 to the fixed mirror 6 side in the X-axis direction.

The total reflection mirror surface 72 is a surface parallel to the half mirror surfaces 71a and 71b, overlaps the mirror surface 51a of the movable mirror 5 when viewed in the X-axis direction, and overlaps the half mirror surfaces 71a and 71b when viewed in the Y-axis direction. The total reflection mirror surface 72 reflects a portion of the measurement light L0 reflected by the half mirror surface 71a and a portion of the laser light L10, which has been transmitted through the half mirror surface 71a, to the movable mirror 5 side in the X-axis direction.

The optical surface 75c is a surface parallel to the optical surfaces 75a and 75b and overlaps the mirror surface 61a of the fixed mirror 6 when viewed in the X-axis direction. The optical surface 75c allows the remaining portion of the measurement light L0 transmitted through the half mirror surface 71a and the remaining portion of the laser light L10 reflected by the half mirror surface 71a to be transmitted therethrough to the fixed mirror 6 side in the X-axis direction.

The optical surface 75d is a surface parallel to the optical surfaces 75a and 75b and overlaps the mirror surface 51a of the movable mirror 5 when viewed in the X-axis direction. The optical surface 75d allows a portion of the measurement light L0 and a portion of the laser light L10 reflected by the total reflection mirror surface 72 to be transmitted therethrough to the movable mirror 5 side in the X-axis direction.

A half mirror surface 71c is a surface parallel to the half mirror surfaces 71a and 71b and the total reflection mirror surface 72 and is positioned between the half mirror surface 71a and the half mirror surface 71b in the Y-axis direction. The half mirror surface 71c reflects the measurement light L1 in the X-axis direction and allows the laser light L11 to be transmitted therethrough in the Y-axis direction. The half mirror surface 71b allows the laser light L11 transmitted through the half mirror surface 71c to be transmitted therethrough in the Y-axis direction. The measurement light L1 is interference light of a portion of the measurement light L0 which has been sequentially reflected by the mirror surface 51a of the movable mirror 5 and the total reflection mirror surface 72 and has been transmitted through the half mirror surface 71a, and the remaining portion of the measurement light L0 which has been sequentially reflected by the mirror surface 61a of the fixed mirror 6 and the half mirror surface 71a. The laser light L11 is interference light of a portion of the laser light L10 which has been sequentially reflected by the mirror surface 51a of the movable mirror 5 and the total reflection mirror surface 72 and has been transmitted through the half mirror surface 71a, and the remaining portion of the laser light L10 which has been sequentially reflected by the mirror surface 61a of the fixed mirror 6 and the half mirror surface 71a.

The optical surface 75f is a surface parallel to the optical surfaces 75c and 75d and overlaps the half mirror surface 71c when viewed in the X-axis direction. The optical surface 75f allows the measurement light L1 reflected by the half mirror surface 71c to be transmitted therethrough in the X-axis direction.

In addition, as illustrated in (b) of FIG. 8, in the configuration of the beam splitter unit 7 illustrated in FIG. 1, the interference optical system I2 for the laser light L10 can be constituted of the movable mirror 5, the fixed mirror 12, and the beam splitter unit 7 by causing the total reflection mirror surface 72 for the measurement light L0 to function as a half mirror surface for the laser light L10. In the configuration illustrated in (b) of FIG. 8, the fixed mirror 12 is disposed such that the mirror surface 121a faces the total reflection mirror surface 72 in the Y-axis direction, and a dichroic mirror 76 is disposed such that the measurement light L1 and the laser light L11 emitted from the optical surface 73d are isolated from each other.

In addition, as illustrated in (a) of FIG. 9, the interference optical system I1 for the measurement light L0 and the interference optical system I2 for the laser light L10 can be constituted of the movable mirror 5, the fixed mirror 6, and the beam splitter unit 7 by further applying an optical block 77 to the configuration of the beam splitter unit 7 illustrated in (a) of FIG. 4. Similarly, as illustrated in (b) of FIG. 9, the interference optical system I1 for the measurement light L0 and the interference optical system I2 for the laser light L10 can be constituted of the movable mirror 5, the fixed mirror 6, and the beam splitter unit 7 by further applying the optical block 77 to the configuration of the beam splitter unit 7 illustrated in (b) of FIG. 4.

The optical block 77 illustrated in (a) and (b) of FIG. 9 includes a plurality of optical surfaces 77a and 77b and half mirror surfaces 77c and 77d. For example, the optical surface 77a is a surface perpendicular to the X-axis direction and allows the laser light L10 incident in the X-axis direction to be transmitted therethrough. For example, the half mirror surface 77c is a surface inclined with respect to the optical surface 77a by 45θ and overlaps the optical surface 77a when viewed in the X-axis direction. The half mirror surface 77c reflects the laser light L10, which has been transmitted through the optical surface 77a, in the Y-axis direction. The half mirror surface 77d is a surface parallel to the half mirror surface 77c, overlaps the optical surface 73a when viewed in the X-axis direction, and overlaps the half mirror surface 77c when viewed in the Y-axis direction. The half mirror surface 77d allows the measurement light L0 incident in the X-axis direction to be transmitted therethrough and reflects the laser light L0, which has been reflected by the half mirror surface 77c, to the optical surface 73a side in the X-axis direction. The optical surface 77b is a surface parallel to the optical surface 77a and overlaps the optical surface 73a when viewed in the X-axis direction. The optical surface 77b allows the measurement light L0 transmitted through the half mirror surface 77d and the laser light L10 reflected by the half mirror surface 77d to be transmitted therethrough to the optical surface 73a side in the X-axis direction.

In the configuration illustrated in (a) and (b) of FIG. 9, similar to the configuration illustrated in (a) and (b) of FIG. 4, the measurement light L1 is emitted from the optical surface 73d. After being sequentially transmitted through the optical surfaces 73a and 77b, the laser light L11 is reflected by the half mirror surface 77d and is emitted from the half mirror surface 77c. The measurement light L1 is interference light of a portion of the measurement light L0 which has been sequentially reflected by the mirror surface 51a of the movable mirror 5 and the total reflection mirror surface 72 and has been transmitted through the half mirror surface 71, and the remaining portion of the measurement light L0 which has been sequentially reflected by the mirror surface 61a of the fixed mirror 6 and the half mirror surface 71. The laser light L11 is interference light of a portion of the laser light L10 which has been sequentially reflected by the mirror surface 51a of the movable mirror 5, the total reflection mirror surface 72, and the half mirror surface 71; and the remaining portion of the laser light L10 which has been reflected by the mirror surface 61a of the fixed mirror 6 and has been transmitted through the half mirror surface 71.

MODIFICATION EXAMPLES

Hereinabove, the embodiments of the present disclosure have been described. However, the present disclosure is not limited to the foregoing embodiments. For example, at least a portion of the driving region 32 may be positioned on the other side of the fixed mirror 6 in the X-axis direction instead of one side of the fixed mirror 6 in the X-axis direction when viewed in the Z-axis direction. Specifically, the fixed mirror 6 may be disposed between one elastic support region 34 of the driving region 32 and the beam splitter unit 7. Similarly, at least a portion of the driving region 32 may be positioned on the other side of the fixed mirror 12 in the X-axis direction instead of one side of the fixed mirror 12 in the X-axis direction when viewed in the Z-axis direction. Specifically, the fixed mirror 12 may be disposed between one elastic support region 34 of the driving region 32 and the beam splitter unit 7.

In addition, at least one of the fixed mirrors 6 and 12, the beam splitter unit 7, and the light transmitting member 11 does not have to be mounted on the base 10. For example, at least one the fixed mirrors 6 and 12, the beam splitter unit 7, and the light transmitting member 11 may be mounted on a base different from the base 10.

In addition, as illustrated in (b) of FIG. 4, the light transmitting member 11 may be disposed on the optical path P1 between the beam splitter unit 7 and the movable mirror 5. In addition, the light transmitting member 11 may be disposed on both optical paths which are the optical path P1 between the beam splitter unit 7 and the movable mirror 5, and the optical path P2 between the beam splitter unit 7 and the fixed mirror 6. That is, the light transmitting member 11 need only be disposed on at least one optical path of the optical path P1 between the beam splitter unit 7 and the movable mirror 5, and the optical path P2 between the beam splitter unit 7 and the fixed mirror 6.

In addition, the filter 15 need only be disposed on an optical path where laser light does not travel and measurement light travels, and the position thereof is not limited. For example, the filter 15 may be disposed at both places between the beam splitter unit 7 and the movable mirror 5 and between the beam splitter unit 7 and the fixed mirror 6.

In addition, the mirror surface 51a of the movable mirror 5, the mirror surface 61a of the fixed mirror 6, and the mirror surface 121a of the fixed mirror 12 need only have a positional relationship of intersecting the main surface 10a of the base 10 and are not limited to surfaces positioned on a side opposite to the support layer 2 with respect to the device layer 3. For example, the mirror surface 51a of the movable mirror 5, the mirror surface 61a of the fixed mirror 6, and the mirror surface 121a of the fixed mirror 12 may directly intersect the main surface 10a of the base 10. For example, they may directly penetrate the device layer 3.

REFERENCE SIGNS LIST 1a, 1b . . . optical module, 2 . . . support layer, 3 . . . device layer, 4 . . . intermediate layer, 5 . . . movable mirror, 6 . . . fixed mirror (first fixed mirror), 7 . . . beam splitter unit, 8 . . . measurement light incident unit, 9 . . . measurement light emission unit, 10 . . . base, 10a . . . main surface, 11 . . . light transmitting member, 12 . . . fixed mirror (second fixed mirror), 13 . . . light source, 14 . . . light detector, 15 . . . filter, 31 . . . mounting region, 31b . . . opening, 32 . . . driving region, 51 . . . mirror portion, 51a . . . mirror surface, 52 . . . elastic portion, 54 . . . leg portion (support portion), 55 . . . interlock portion (support portion), 61a . . . mirror surface, 71 . . . half mirror surface, 72 . . . total reflection mirror surface, 121a . . . mirror surface, L0, L1 . . . measurement light, L10, L11 . . . laser light, I1 . . . interference optical system (first interference optical system), I2 . . . interference optical system (second interference optical system), P1 . . . optical path (first optical path), P2 . . . optical path (second optical path)

The invention claimed is:

1. An optical module comprising:
a base which has a main surface and in which a mounting region and a driving region for moving the mounting region along a first direction parallel to the main surface are provided;
a movable mirror which has a mirror surface having a positional relationship of intersecting the main surface and is mounted in the mounting region;
a first fixed mirror which has a mirror surface having a positional relationship of intersecting the main surface and of which a position with respect to the base is fixed; and
a beam splitter unit which constitutes a first interference optical system for measurement light together with the movable mirror and the first fixed mirror,
wherein the mirror surface of the movable mirror and the mirror surface of the first fixed mirror are directed to one side in the first direction.

2. The optical module according to claim 1,
wherein an opening is formed in the mounting region,
wherein the movable mirror has
a mirror portion which has the mirror surface,
an elastic portion which is coupled to the mirror portion, and
a support portion to which an elastic force is applied in accordance with elastic deformation of the elastic portion,
wherein the support portion is inserted into the opening in a state where an elastic force of the elastic portion is applied, and
wherein the movable mirror is fixed to the mounting region due to a reaction force of the elastic force applied from an inner surface of the opening to the support portion.

3. The optical module according to claim 1,
wherein the first fixed mirror is positioned on one side with respect to the movable mirror in a second direction parallel to the main surface and perpendicular to the first direction, and
wherein at least a portion of the driving region is positioned on the one side or the other side of the first fixed mirror in the first direction when viewed in a third direction perpendicular to the main surface.

4. The optical module according to claim 1,
wherein the beam splitter unit includes
a half mirror surface which reflects a portion of the measurement light and allows a remaining portion of the measurement light to be transmitted therethrough, and
a total reflection mirror surface which reflects the portion of the measurement light reflected by the half mirror surface, and
wherein the half mirror surface and the total reflection mirror surface are parallel to each other.

5. The optical module according to claim 1,
wherein the first fixed mirror is mounted on the base.

6. The optical module according to claim 1,
wherein the beam splitter unit is mounted on the base.

7. The optical module according to claim 1, further comprising:
a light transmitting member which is disposed on at least one optical path of a first optical path between the beam splitter unit and the movable mirror and a second optical path between the beam splitter unit and the first fixed mirror and corrects an optical path difference between the first optical path and the second optical path.

8. The optical module according to claim 7, wherein the light transmitting member is mounted on the base.

9. The optical module according to claim 1, further comprising:
a measurement light incident unit which is disposed such that the measurement light is incident on the first interference optical system from outside; and
a measurement light emission unit which is disposed such that the measurement light is emitted from the first interference optical system to the outside.

10. The optical module according to claim 1, further comprising:
a second fixed mirror which has a mirror surface having a positional relationship of intersecting the main surface and of which a position with respect to the base is fixed,
wherein the beam splitter unit constitutes a second interference optical system for laser light together with the movable mirror and the second fixed mirror, and
wherein the mirror surface of the second fixed mirror is directed to the one side in the first direction.

11. The optical module according to claim 10,
wherein the first fixed mirror and the second fixed mirror are respectively positioned on both sides with respect to the movable mirror in a second direction parallel to the main surface and perpendicular to the first direction, and
wherein at least a portion of the driving region is positioned on the one side or the other side of the first fixed mirror in the first direction and on the one side or the other side of the second fixed mirror in the first direction when viewed in a third direction perpendicular to the main surface.

12. The optical module according to claim 10, further comprising:
a filter which is disposed on an optical path where the laser light does not travel and the measurement light travels and cuts light within a wavelength range including a center wavelength of the laser light.

13. The optical module according to claim 10, further comprising:
a light source which generates the laser light to be incident on the second interference optical system; and
a light detector which detects the laser light emitted from the second interference optical system.

14. The optical module according to claim 1,
wherein the base has
a device layer which has the main surface and in which the mounting region and the driving region are provided,
a support layer which supports the device layer, and
an intermediate layer which is provided between the support layer and the device layer,
wherein the support layer is a first silicon layer of an SOI substrate,
wherein the device layer is a second silicon layer of the SOI substrate, and
wherein the intermediate layer is an insulating layer of the SOI substrate.

* * * * *